US011181544B2

(12) United States Patent
Ashmore

(10) Patent No.: US 11,181,544 B2
(45) Date of Patent: Nov. 23, 2021

(54) CONFIGURABLE FLOW VELOCIMETER

(71) Applicant: Bradley Charles Ashmore, Mountain View, CA (US)

(72) Inventor: Bradley Charles Ashmore, Mountain View, CA (US)

( * ) Notice: Subject to any disclaimer, the term of this patent is extended or adjusted under 35 U.S.C. 154(b) by 0 days.

(21) Appl. No.: 17/179,737

(22) Filed: Feb. 19, 2021

(65) Prior Publication Data

US 2021/0263063 A1 Aug. 26, 2021

Related U.S. Application Data

(60) Provisional application No. 62/979,035, filed on Feb. 20, 2020.

(51) Int. Cl.
*G01P 5/14* (2006.01)
*G01P 1/02* (2006.01)

(52) U.S. Cl.
CPC . *G01P 5/14* (2013.01); *G01P 1/02* (2013.01)

(58) Field of Classification Search
CPC ..................................... G01P 5/14; G01P 1/02
See application file for complete search history.

(56) References Cited

U.S. PATENT DOCUMENTS

| | | | |
|---|---|---|---|
| 4,393,451 A | 7/1983 | Barker | |
| 4,453,419 A | 6/1984 | Engelke | |
| 5,231,596 A | 7/1993 | Nakazawa et al. | |
| 5,297,421 A | 3/1994 | Hosonuma et al. | |
| 5,423,209 A | 6/1995 | Nakaya et al. | |
| 5,485,843 A | 1/1996 | Greenstein et al. | |
| 5,832,411 A | 11/1998 | Schatzmann et al. | |
| 5,929,331 A | 7/1999 | Kinser et al. | |
| 6,237,426 B1 | 5/2001 | Gryc et al. | |
| 6,601,460 B1 | 8/2003 | Materna | |

(Continued)

FOREIGN PATENT DOCUMENTS

WO 2016/135061 A1 9/2016

OTHER PUBLICATIONS

International Search Report and Written Opinion dated Mar. 23, 2018, from the ISA/US, for International Patent Application No. PCT/US18/12109 (filed Jan. 2, 2018), 11 pages.
Notice of Allowance dated Feb. 6, 2019, for U.S. Appl. No. 15/397,426 (filed Jan. 3, 2017), 8 pages.
Amendment filed Jan. 10, 2019, for U.S. Appl. No. 15/397,426 (filed Jan. 3, 2017), 9 pages.

(Continued)

*Primary Examiner* — Paul M. West
(74) *Attorney, Agent, or Firm* — Ascenda Law Group, PC

(57) ABSTRACT

A monitoring device includes a sensor module disposed between an aeroshell and a cavity assembly. A surface of the aeroshell and a surface of the cavity assembly may form a flow-facing surface of the monitoring device. A junction area on the flow-facing surface within which the aeroshell abuts the cavity assembly may be a smooth surface to minimize the disruption to the surrounding flow of fluid. The sensor module may sample the absolute pressure from ports distributed about the flow-facing surface. The absolute pressure measurements may be used to compute the velocity of the fluid flow, including speed and/or direction. The monitoring device may be powered by inductively received energy or harvested energy. In one variant of the monitoring device, the monitoring device may be constructed from an electrically coupled mosaic of flexible thin-profile tiles, each of which may be responsible for one functional aspect of the monitoring device.

20 Claims, 30 Drawing Sheets

(56) References Cited

U.S. PATENT DOCUMENTS

| | | | |
|---|---|---|---|
| 7,093,483 | B2 | 8/2006 | Corey et al. |
| 8,687,175 | B2 | 4/2014 | Diatzikis et al. |
| 9,279,666 | B1 | 3/2016 | Balasubramaniam et al. |
| 9,476,900 | B2 | 10/2016 | Akada |
| 10,324,104 | B2 | 6/2019 | Ashmore |
| 10,598,683 | B2 | 3/2020 | Ashmore |
| 10,884,013 | B2 | 1/2021 | Ashmore |
| 2002/0100316 | A1 | 8/2002 | James et al. |
| 2005/0081497 | A1* | 4/2005 | Connor .............. B01D 46/2411 55/493 |
| 2005/0237730 | A1* | 10/2005 | Barnes ..................... F21K 2/06 362/34 |
| 2006/0060001 | A1 | 3/2006 | Kurtz et al. |
| 2007/0256506 | A1 | 11/2007 | Sette |
| 2009/0071258 | A1 | 3/2009 | Kouda et al. |
| 2010/0006670 | A1 | 1/2010 | Bourrilhon et al. |
| 2011/0094311 | A1 | 4/2011 | Khimji |
| 2012/0224955 | A1 | 9/2012 | Vine |
| 2013/0270446 | A1 | 10/2013 | Dardona et al. |
| 2014/0123751 | A1 | 5/2014 | Lu |
| 2014/0124057 | A1 | 5/2014 | Freund et al. |
| 2014/0130608 | A1 | 5/2014 | Adams |
| 2014/0152468 | A1 | 6/2014 | Obenchain |
| 2015/0017619 | A1 | 1/2015 | Ashmore |
| 2015/0320950 | A1 | 11/2015 | Borner |
| 2015/0364315 | A1 | 12/2015 | Ramsey et al. |
| 2015/0377662 | A1 | 12/2015 | Ray |
| 2016/0131013 | A1 | 5/2016 | Yi et al. |
| 2016/0377469 | A1 | 12/2016 | Teli |
| 2017/0192031 | A1* | 7/2017 | Ashmore ................ G01P 13/02 |
| 2017/0197056 | A1 | 7/2017 | Van Schalkwyk et al. |
| 2020/0215988 | A1* | 7/2020 | Jackson ................. B60R 11/00 |

OTHER PUBLICATIONS

Non-Final Office Action dated Dec. 20, 2018, for U.S. Appl. No. 15/397,426 (filed Jan. 3, 2017), 11 pages.
Supplemental Amendment filed Oct. 3, 2018, for U.S. Appl. No. 15/397,426 (filed Jan. 3, 2017), 3 pages.
Amendment filed Sep. 19, 2018, for U.S. Appl. No. 15/397,426 (filed Jan. 3, 2017), 6 pages.
Non-Final Office Action dated Sep. 6, 2018, for U.S. Appl. No. 15/397,426 (filed Jan. 3, 2017), 11 pages.
International Preliminary Examination Report on Patentability dated Jul. 18, 2019, from the International Bureau of WIPO, for International Application No. PCT/US2018/012109 (filed Jan. 2, 2018), 10 pages.
Notice of Allowance dated Nov. 12, 2019, for U.S. Appl. No. 16/415,115 (filed May 17, 2019), 9 pages.
Amendment filed Oct. 22, 2019, for U.S. Appl. No. 16/415,115 (filed May 17, 2019), 10 pages.
Non-Final Office Action dated Jul. 31, 2019, for U.S. Appl. No. 16/415,115 (filed May 17, 2019), 15 pages.
Notice of Allowance dated Nov. 19, 2020, for U.S. Appl. No. 16/805,359 (filed Feb. 28, 2020), 8 pgs.
Response to Office Action filed Nov. 3, 2020, for U.S. Appl. No. 16/805,359 (filed Feb. 28, 2020), 4 pgs.
Non-Final Office Action dated Oct. 20, 2020, for U.S. Appl. No. 16/805,359 (filed Feb. 28, 2020), 19 pgs.
Amendment filed Jul. 9, 2020, for U.S. Appl. No. 16/805,359 (filed Feb. 28, 2020), 6 pgs.
Non-Final Office Action dated Apr. 27, 2020, for U.S. Appl. No. 16/805,359 (filed Feb. 28, 2020), 19 pgs.

* cited by examiner

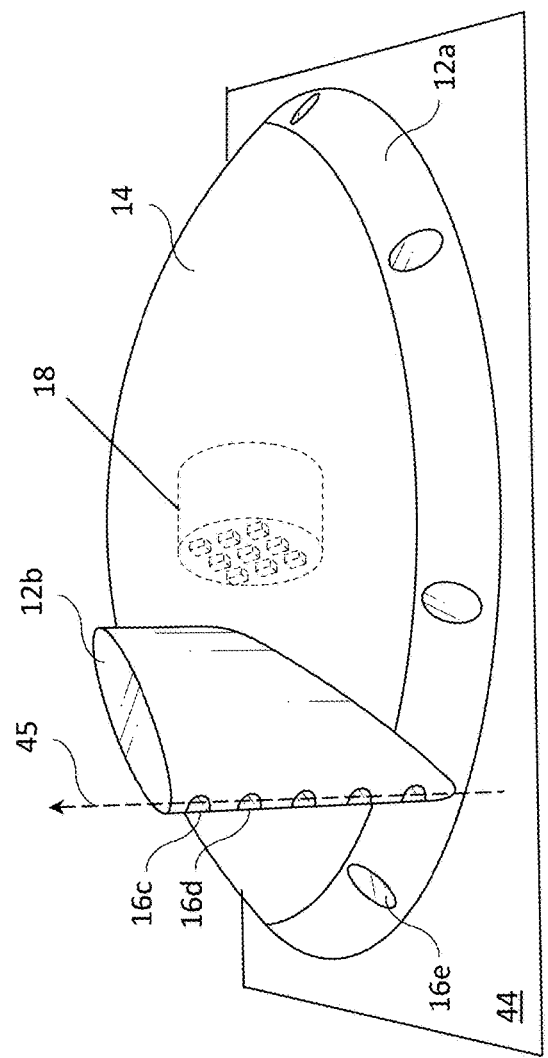
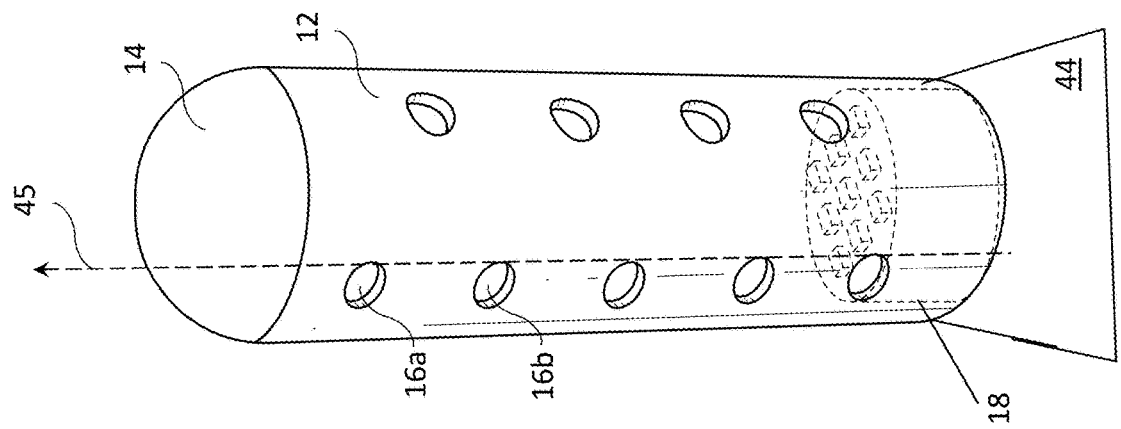
Fig. 8B
Fig. 8A

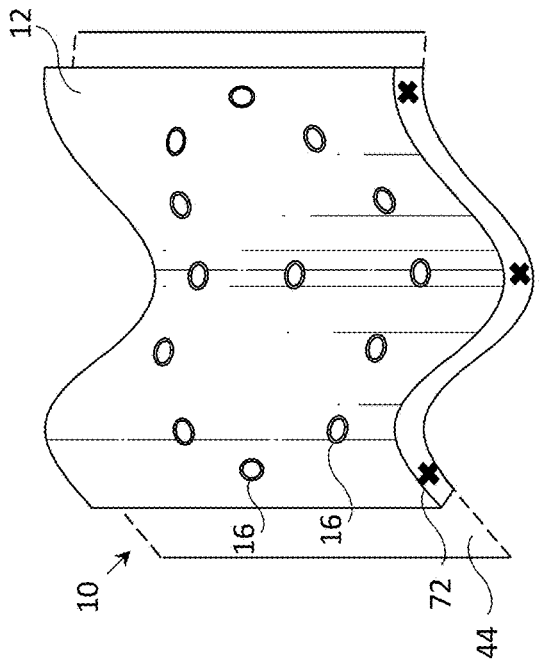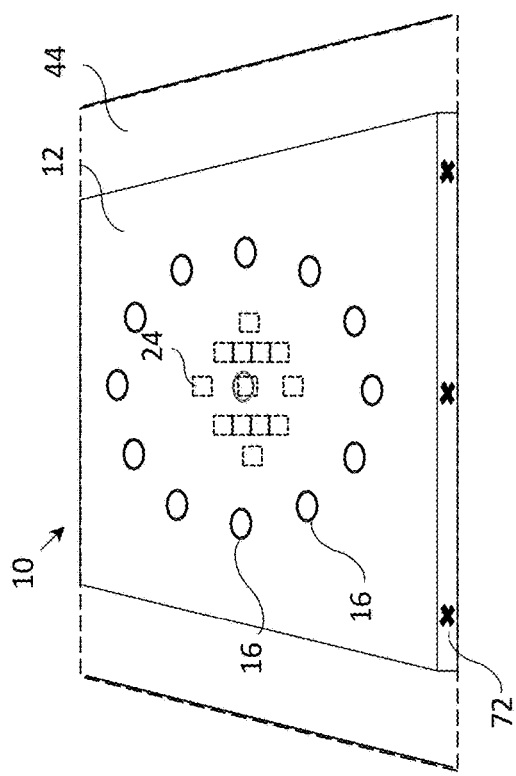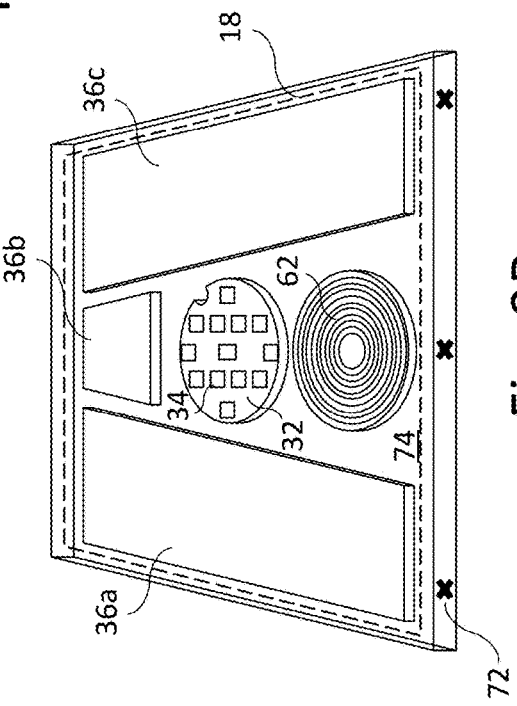
Fig. 9A
Fig. 9B
Fig. 9C

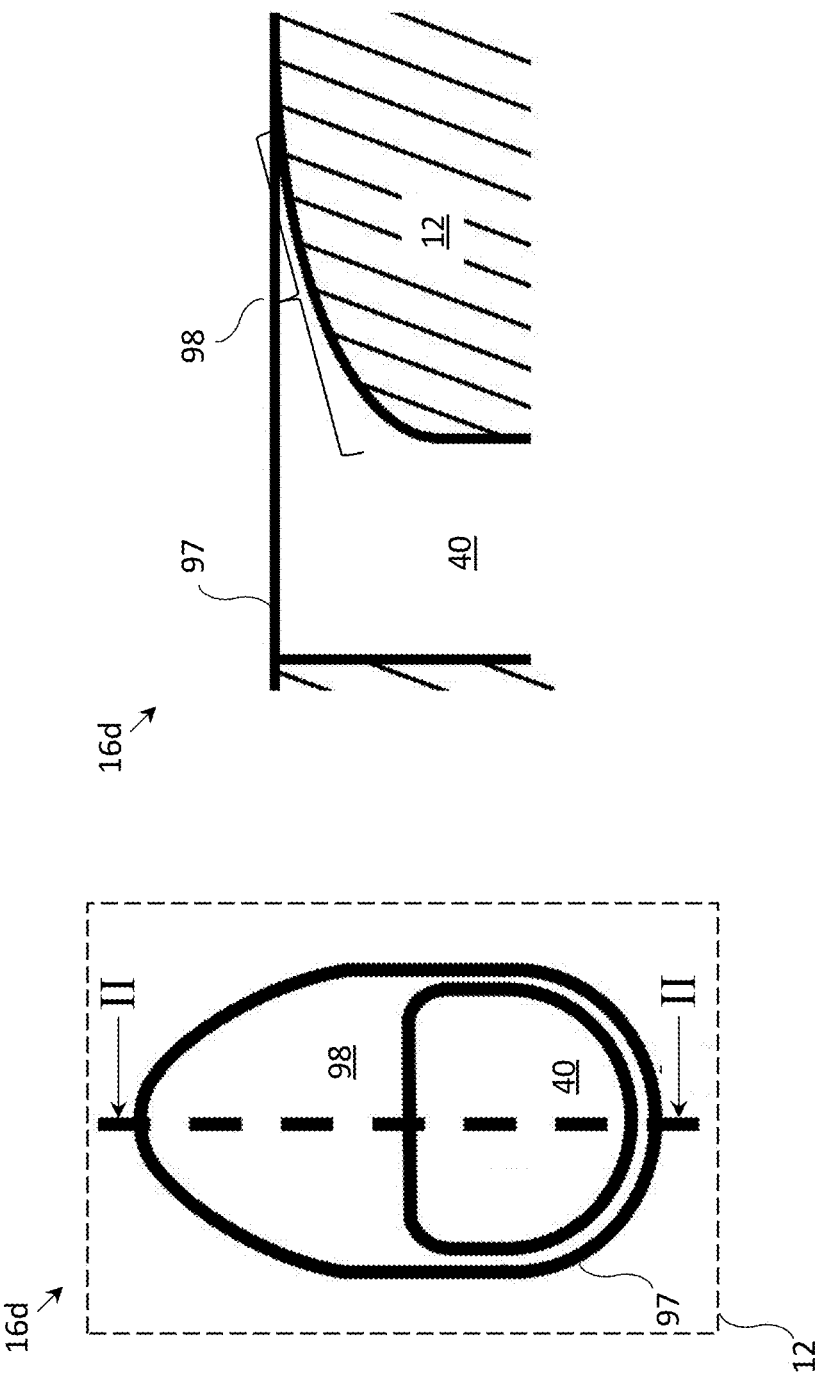

CONFIGURABLE FLOW VELOCIMETER

RELATED APPLICATIONS

This application is a non-provisional patent application of and claims priority to U.S. Provisional Application No. 62/979,035, filed 20 Feb. 2020, which is incorporated by reference herein.

FIELD OF THE INVENTION

The present invention relates to a configurable flow velocimeter with a modular assembly.

BACKGROUND

The measurement of flow velocity, including direction and speed, is useful in diverse domains, such as the aerospace, agriculture, and automotive domains. Currently, a wide variety of instruments are available to probe a flow of fluid, in which a fluid may refer to a gas or a liquid. Many of these instruments are optimized to measure flows in a controlled environment, for example, a wind tunnel. Such instruments may have a highly sensitive probe, but also comparatively bulky hardware.

SUMMARY OF THE INVENTION

In one embodiment of the invention, a monitoring device includes a sensor module disposed between an aeroshell and a cavity member. A surface of the aeroshell and a surface of the cavity assembly may form a flow-facing surface of the monitoring device. To minimize the disruption to the surrounding flow of fluid, a junction area on the flow-facing surface within which the aeroshell abuts the cavity assembly may be a smooth surface. The aeroshell may be securely attached to the cavity assembly by pressing the aeroshell against the cavity assembly and rotating the aeroshell in a clockwise or counterclockwise direction.

The sensor module with a plurality of sensors may sample the absolute pressure from ports distributed about the flow-facing surface. The ports may have a variety of shapes including circular, oval, slot-shaped, triangular, a triangular with rounded corners or other shapes. The shape of the ports may impact the resolution at which the flow direction can be measured. In one embodiment, the sensors may be distributed on a single planar surface. However, to provide an additional degree freedom to more easily connect sensors to the ports on the flow-facing surface, the sensors may be distributed on multiple planar surface that are parallel to one another.

The absolute pressure measurements may be used to compute the velocity of the fluid flow, including speed and/or direction. To compute the flow direction, sensors may be ranked based in order from the sensor with the highest pressure measurement to the sensor with the lower pressure measurement. Such ranking may form a pressure pattern. A lookup table may be used to map the pressure pattern to a flow direction. To compute the flow speed, another lookup table may be used to map the determined flow direction and maximum pressure difference across the sensors to the flow speed. Additional details of the processing of the absolute pressure measurements to arrive at the speed and/or direction may be found in U.S. Pat. No. 10,324,104 to Bradley Charles Ashmore, incorporated herein by reference in its entirety.

The monitoring device may be powered by inductively received energy and/or harvested energy. In the former case, a wireless charger may be placed in close proximity to the monitoring device in order to inductively charge a rechargeable battery of the monitoring device. In the latter case, solar panels disposed on a surface of the monitoring device may be used to collect solar energy, which is then converted to DC power to recharge a rechargeable battery of the monitoring device.

The profile of the monitoring may be dome-shaped, conical, rod shaped (in the case of a "rake probe") or may have a thin profile that resembles a tile. In the tile embodiment, one tile may form a monitoring device, or a group of tiles may be assembled together in the form of a mosaic or tessellation to form a monitoring device. In the latter case, each tile may be responsible for one or more functional aspects of the monitoring device. For example, one tile may be responsible for supplying power; one tile may be responsible for sampling the pressure, one tile may be responsible for processing the pressure measurements, and so on. Additionally, in the tile embodiment, the monitoring device may be made from a flexible material so that portions of or an entirety thereof may be flexible to allow the monitoring device to conform to a non-planar surface to which the monitoring device is mounted.

These and other embodiments of the invention are more fully described in association with the drawings below.

BRIEF DESCRIPTION OF THE DRAWINGS

The invention is now described, by way of example and without limiting the scope of the invention, with reference to the accompanying drawings which illustrate embodiments of it, in which:

FIG. 8A depicts a monitoring device with a "rake" probe configuration, in which ports of the cavity assembly are arranged in a vertical manner, in accordance with one embodiment of the invention.

FIG. 8B depicts a monitoring device with an aerodynamic interface that combines a dome configuration of FIG. 1A with the rake probe configuration of FIG. 8A, in accordance with one embodiment of the invention.

FIG. 9A depicts a thin-profile monitoring device in a (default) flat state, in accordance with one embodiment of the invention.

FIG. 9B depicts internal components of the monitoring device of FIG. 9A, in accordance with one embodiment of the invention.

FIG. 9C depicts the flexible nature of the monitoring device of FIG. 9A, in accordance with one embodiment of the invention.

FIG. 18A depicts a top view of a port of a monitoring device, in accordance with one embodiment of the invention.

FIG. 18B depicts a cross sectional view of the port of FIG. 18A along cut line II-II, in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components.

Figure 1A:
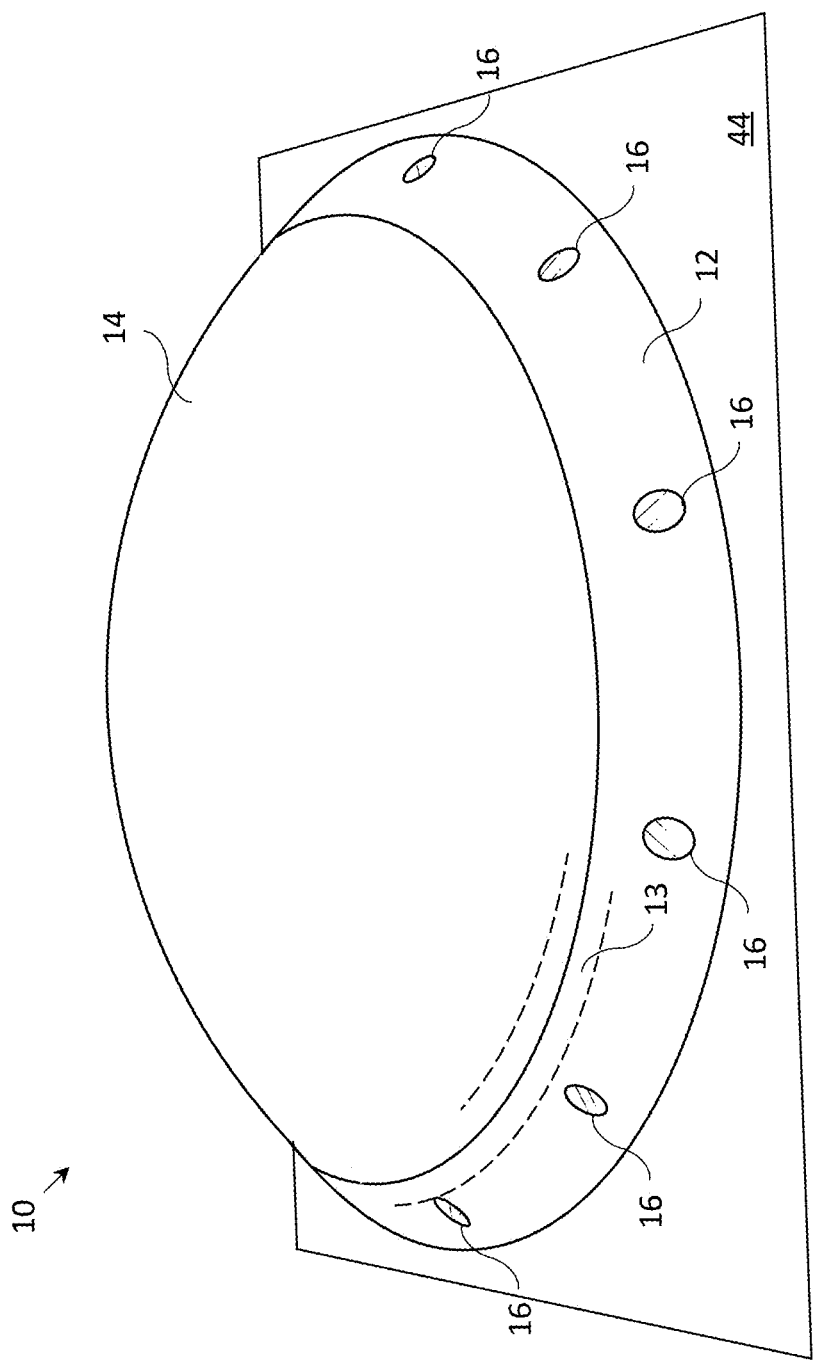
FIG. 1A depicts a perspective view of a monitoring device for measuring a flow velocity, in accordance with one embodiment of the invention.

FIG. 1A depicts a perspective view of monitoring device 10 for measuring a velocity of a flow of a fluid. In some embodiments, only the speed of the fluid may be measured by monitoring device 10; in other embodiments, only the direction of the fluid may be measured by monitoring device 10; while in other embodiments, both the speed and the direction of the fluid may be measured by monitoring device 10. The fluid is not explicitly depicted in FIG. 1A, but one can imagine a fluid that occupies a volume bounded by surface 44. Monitoring device 10 is mounted on surface 44 and is also contained within this volume that is bounded by surface 44.

Monitoring device 10 may include an aeroshell 14 that is securely attached to cavity assembly 12 that includes a plurality of cavities (not visible in FIG. 1A). Cavity assembly 12 may include a plurality of ports (or openings) 16 that are fluidly coupled to at least one of the cavities of cavity assembly 12. While all the visible ports have been labeled in FIG. 1A, many of the ports in the subsequent figures will not be labeled to not unnecessarily clutter the drawings. Aeroshell 14 may comprise a convex surface. In contrast to cavity assembly 12, aeroshell 14 may not contain any ports.

A sensor module (not visible in FIG. 1A) may be disposed between aeroshell 14 and cavity assembly 12. The sensor module may contain a plurality of sensors that each is located within a cavity of cavity assembly 12. In one embodiment, each of the sensors is configured to measure an absolute pressure of the fluid within a respective cavity of cavity assembly 12. The absolute pressure measurements may be used to compute the velocity of the fluid flow, including speed and/or direction. To compute the flow direction, sensors may be ranked based in order from the sensor with the highest pressure measurement to the sensor with the lower pressure measurement. Such ranking may form a pressure pattern. A lookup table may be used to map the pressure pattern to a flow direction. The lookup table may be populated by subjecting an actual (or simulated) monitoring device to an actual (or simulated) flow with a known flow direction and measuring the actual (or simulated) pressure pattern. To compute the flow speed, another lookup table may be used to map the determined flow direction and maximum pressure difference across the sensors to the flow speed. This latter lookup table may be populated by subjecting an actual (or simulated) monitoring device to an actual (or simulated) flow with a known flow speed and direction and measuring the actual (or simulated) maximum pressure difference. Additional details of the processing of the absolute pressure measurements to arrive at the speed and/or direction may be found in U.S. Pat. No. 10,324,104 to Bradley Charles Ashmore.

Figure 1B:
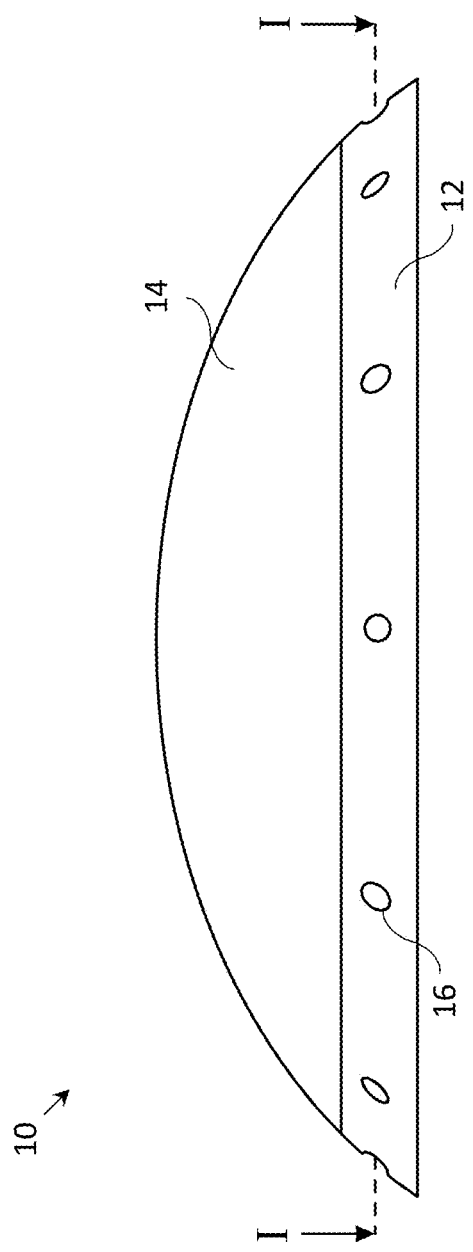
FIG. 1B depicts a front view of the monitoring device, in accordance with one embodiment of the invention.

A surface of aeroshell 14 and a surface of the cavity assembly 12 may form a flow-facing surface of monitoring device 10 (i.e., a surface of monitoring device 10 that faces the fluid that is being monitored). More specifically, monitoring device 10 may include a contact surface (not depicted) that contacts surface 44 (also referred to as a "mounting surface"). The surface of monitoring device 10 excluding the contact surface may be generally referred to as the flow-facing surface. To suppress the creation of turbulent flows, junction area 13 on the flow-facing surface, within which aeroshell 14 abuts cavity assembly 12, has a smooth surface (e.g., with as minimal of a groove as possible). FIG. 1B depicts a front view of monitoring device 10. A cross section of monitoring device 10 along cut line I-I will be shown in FIG. 1E below.

Figure 1C:
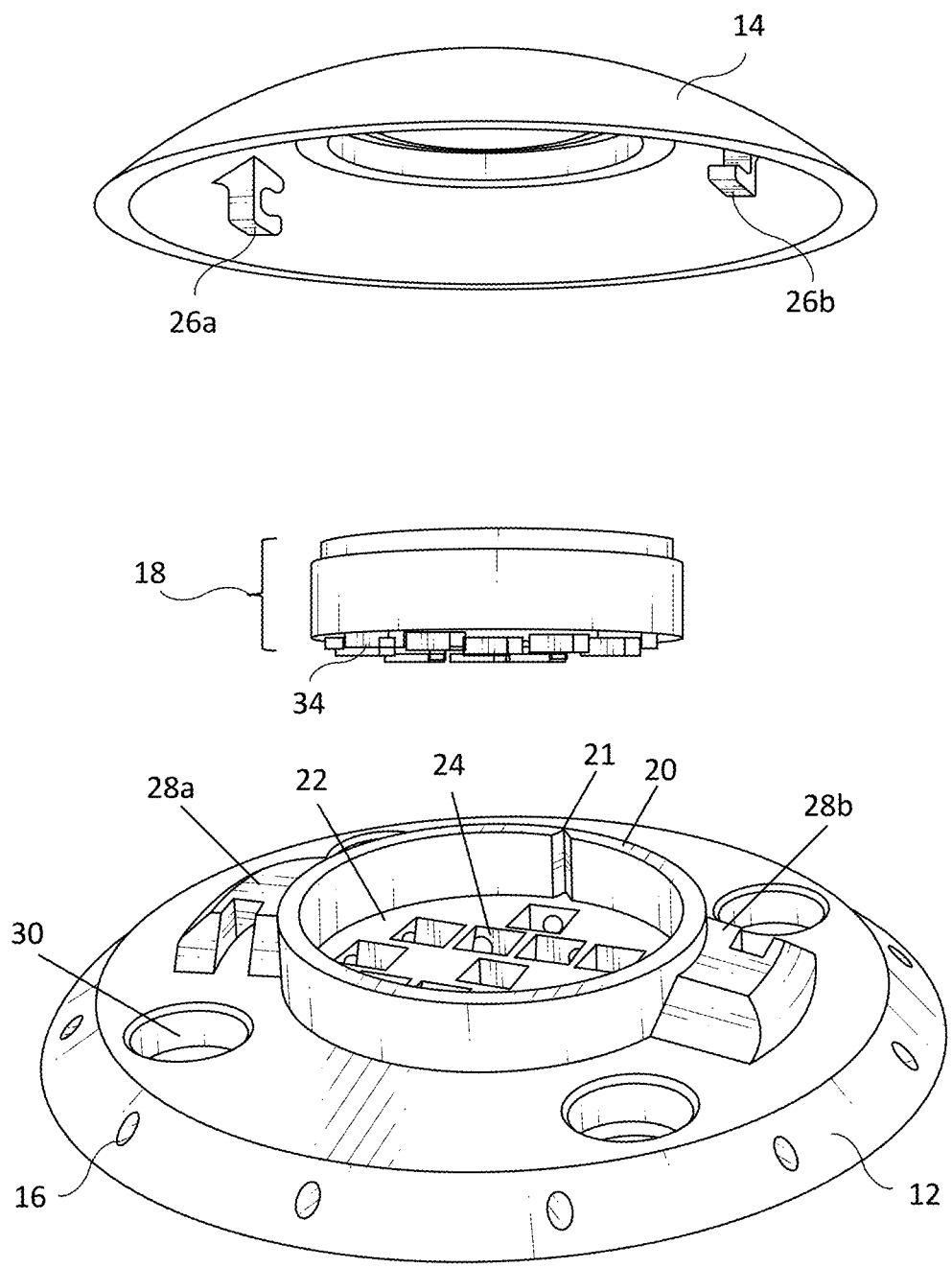
FIG. 1C depicts a partially exploded view of the monitoring device, in accordance with one embodiment of the invention.

FIG. 1C depicts an exploded view of monitoring device 10, which shows sensor module 18 disposed between aeroshell 14 and cavity assembly 12. In the assembled state of monitoring device 10, sensor module 18 may snugly fit within sleeve 20. A "downward" facing (i.e., downward in the orientation depicted in FIG. 1C) surface of sensor module 18 may further be geometrically complementary to surface 22 of cavity assembly 12, such that sensor module 18 may be "plugged" into cavity assembly 12. Alignment groove 21 may be present on sleeve 20 to guide the insertion of sensor module 18 into sleeve 20 so that sensor module 18 may be plugged into cavity assembly 12 at only one specific orientation with respect to cavity assembly 12. It is understood that a ridge or a protuberance (not depicted) may be located on a side of sensor module 18, and this ridge or protuberance is configured to slide within groove 21 as sensor module 18 is plugged into cavity assembly 12. At this specific orientation, sensors 34 of sensor module 18 may each be inserted within a corresponding cavity 24 of cavity assembly 12 (of which only one of the sensors and one of the cavities has been labeled so as to not unnecessarily clutter the drawing). As mentioned above, each of the sensors of sensor module 18 is configured to measure an absolute pressure of the fluid within a corresponding cavity 24. Further, as will be more clearly shown in the cross section depicted in FIG. 1E, each of the ports 16 may be fluidly connected to one of the cavities 24.

Mounting holes 30 may be present in cavity assembly 12. Screws (not depicted) may be inserted through mounting holes 30 to secure cavity assembly 12 to mounting surface 44. It is understood that in other embodiments (not depicted), mounting holes 30 may not be present (or may be present but left unused), and cavity assembly 12 may be secured to mounting surface 44 using other attachment means such as magnets, glue, tape, Velcro©, etc.

After sensor module 18 has been inserted into sleeve 20 (and cavity assembly 12 has optionally been secured to mounting surface 44), aeroshell 14 may be secured to cavity assembly 12 by pressing aeroshell 14 against cavity assembly 12 and rotating aeroshell 14 in a clockwise manner (or counter-clockwise in other embodiments) until one or more hooks 26a, 26b of aeroshell 14 catch one or more catching members 28a, 28b of cavity assembly 12. While a hook/catching member type securing mechanism is depicted in FIG. 1C, it is noted that other securing mechanisms may be possible, for example a friction fit coupling mechanism, a tongue and groove coupling mechanism, a threaded coupling mechanism (similar to how a lid is screwed onto ajar), etc.

Figure 1D:
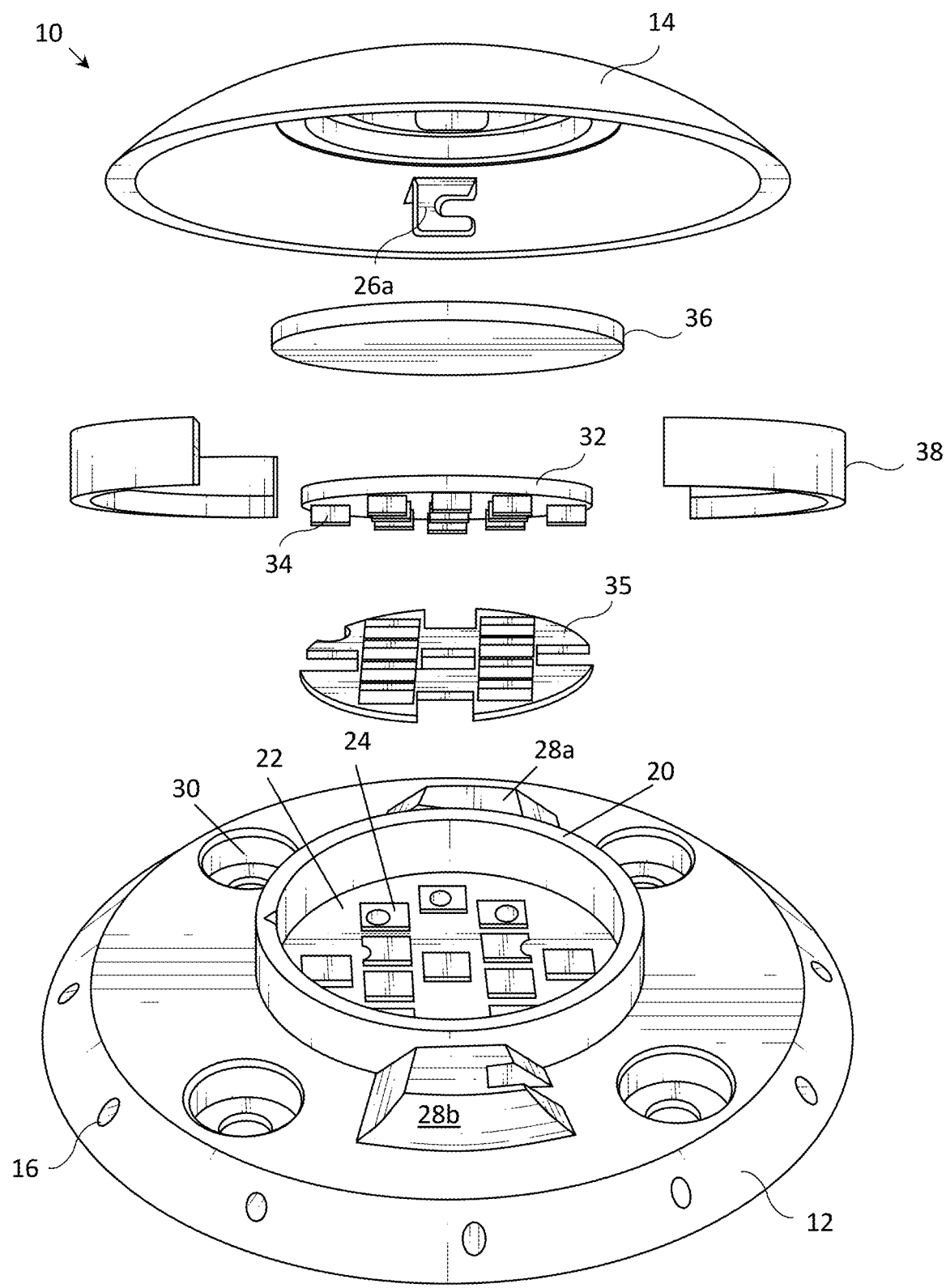
FIG. 1D depicts a further exploded view of the monitoring device (in which components of the sensor module are visible), in accordance with one embodiment of the invention.

FIG. 1D depicts a further exploded view of the monitoring device, in which specific components of sensor module 18 are visible. The components of sensor module 18 may include power source 36, housing 38, gasket 35 and sensor board 32. Sensor board 32 may include a plurality of sensors 34 (e.g., pressure sensors), a processor, memory and one or more I/O devices. An example pressure sensor is the LPS22HH MEMS nano pressure sensor from STMicroelectronics®, with headquarters in Geneva, Switzerland.

Power source 36 may be configured to supply power to sensor module 18. Power source 36 may comprise a rechargeable or non-rechargeable battery. In the case of a rechargeable battery, the power source may be configured to receive inductively transmitted energy (e.g., from a wireless charger) or harvested energy (e.g., harvested solar energy from a solar cell, harvested mechanical vibrational energy from a piezoelectric generator, etc.). In the case of a non-rechargeable battery (e.g., a replaceable battery), the non-rechargeable battery may be disposed between cavity assembly 12 and aeroshell 14 such that removal of aeroshell 14 allows a user to replace the non-rechargeable battery.

The processor (more specifically, a micro-controller) may be configured to receive data from the plurality of sensors 34 and process the data to arrive at the flow speed and/or flow direction. The memory may store the data used and created by the processor.

One or more I/O devices may be used by sensor module 18 to communicate with components external to the sensor module (e.g., a server, a smartphone, etc.). The I/O devices may facilitate a wired and/or wireless interface (e.g., Bluetooth, Wi-Fi) of sensor module 18. The I/O devices may be used to transmit one or more of the measured velocity (e.g., speed and/or direction), pressure measurements, or other measured quantities to remote computing device 50. Gasket 35 may seal the interface between sensor module 18 and cavity assembly 12 to ensure that each sensor 34 measures only the pressure within one cavity 24 of cavity assembly 12. Housing 38 (in particular a cylindrical housing), along with battery 36 and cavity assembly 12 may enclose the sensors 34, processor, memory and I/O devices of sensor module 18.

The function of sensor module 18 (e.g., to determine the velocity of a fluid flow from pressure measurements) may be the same regardless of the surrounding components of the monitoring device 10 within which sensor module 18 is contained. In one embodiment of monitoring device 10, the diameter of the cavity assembly may measure 40 mm; the height of the assembled monitoring device 10 may measure 10 mm; the diameter of sensor module 18 may measure 15 mm; and the height of sensor module 18 may measure 5 mm.

Figure 1E:
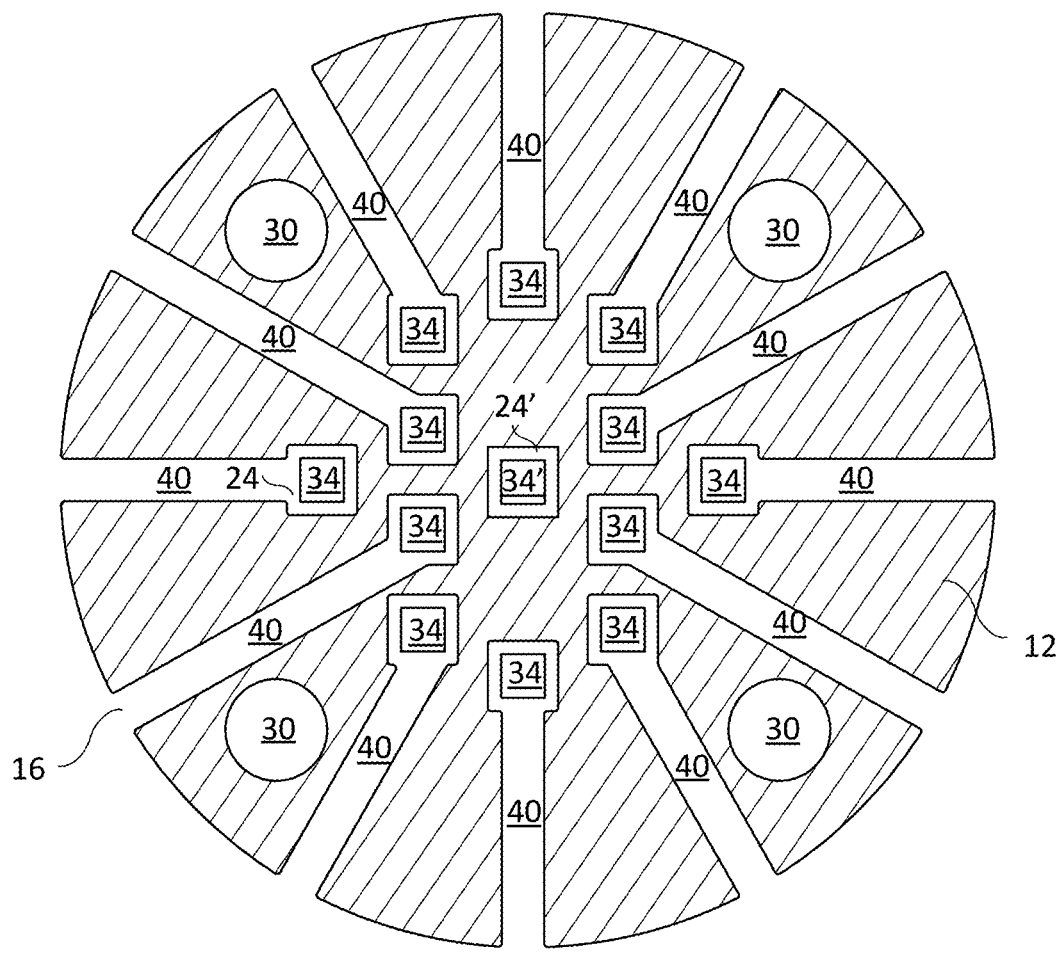
FIG. 1E depicts a cross section of the monitoring device along line I-I, in accordance with one embodiment of the invention.

FIG. 1E depicts a cross section of monitoring device 10 along line I-I depicted in FIG. 1B. In the embodiment of FIG. 1E, each of the ports 16 is fluidly connected to a corresponding one of the cavities 24 via conduit (or channel) 40. A sensor 34 is disposed within each of the cavities 24. If not already apparent, each of the cavities 24 (in the assembled stated of monitoring device 10) is only fluidly connected to the surrounding fluid via a respective port 16, as openings in surface 22 are sealed by gasket 35 and sensor module 18. It is noted that each of the ports 16 may be fitted with a porous mesh insert (not depicted), similar to a window screen, to prevent the accumulation of foreign matter (e.g., dust, insects, etc.) within channels 40 and cavities 24, while still permitting the port to fluidly communicate with the fluid flow.

Figure 1F:
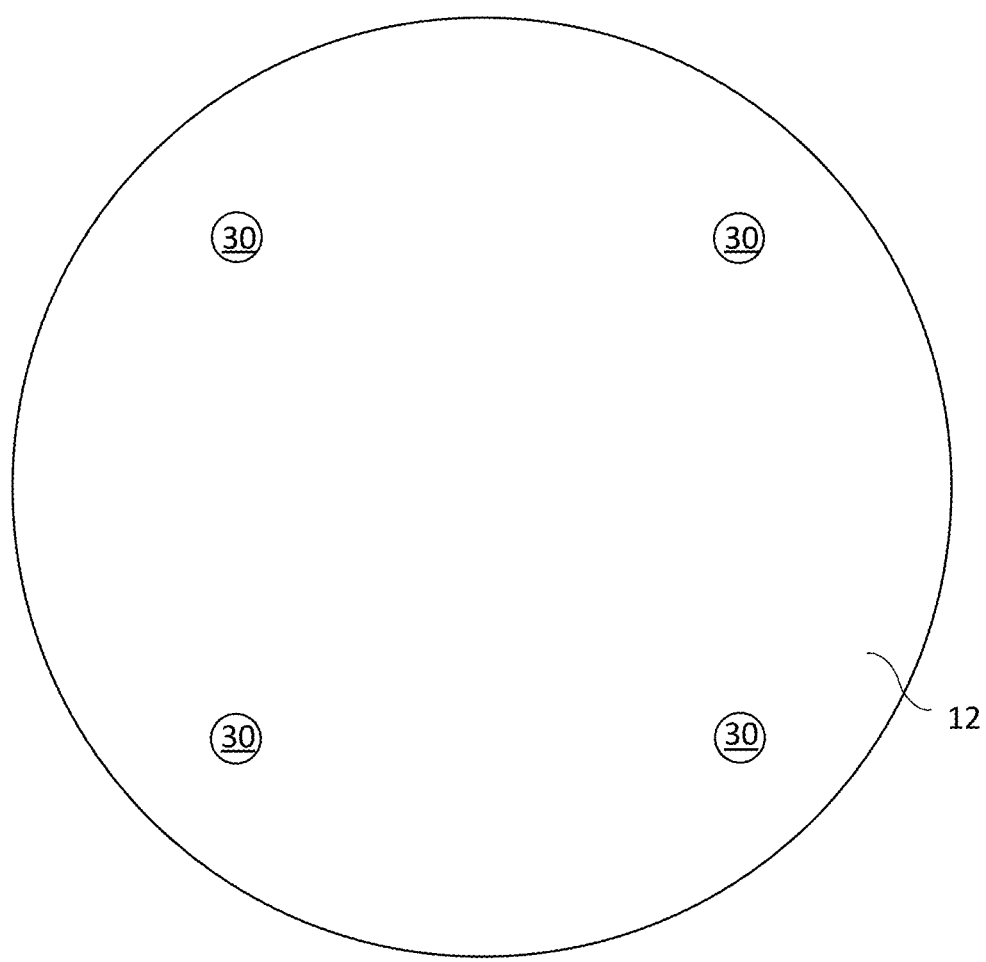
FIG. 1F depicts a bottom view of the monitoring device, in accordance with one embodiment of the invention.

In the embodiment of FIG. 1E, the central most cavity 24' is not connected to any ports and the sensor 34' within cavity 24' may not be utilized by monitoring device 10. The reason for sensor 34' is due to the modular design of sensor module 18. While sensor 34' may not be used in monitoring device 10 depicted in FIGS. 1A-1H, sensor 34' may be used in other monitoring devices (as will be shown in later described embodiments, such as in FIGS. 9A-9C). Mounting holes 30 may also be visible in the cross section depicted in FIG. 1E. FIG. 1F depicts a bottom view of monitoring device 10, in which the mounting holes 30 are visible on the contact surface of cavity assembly 12.

Figure 1G:
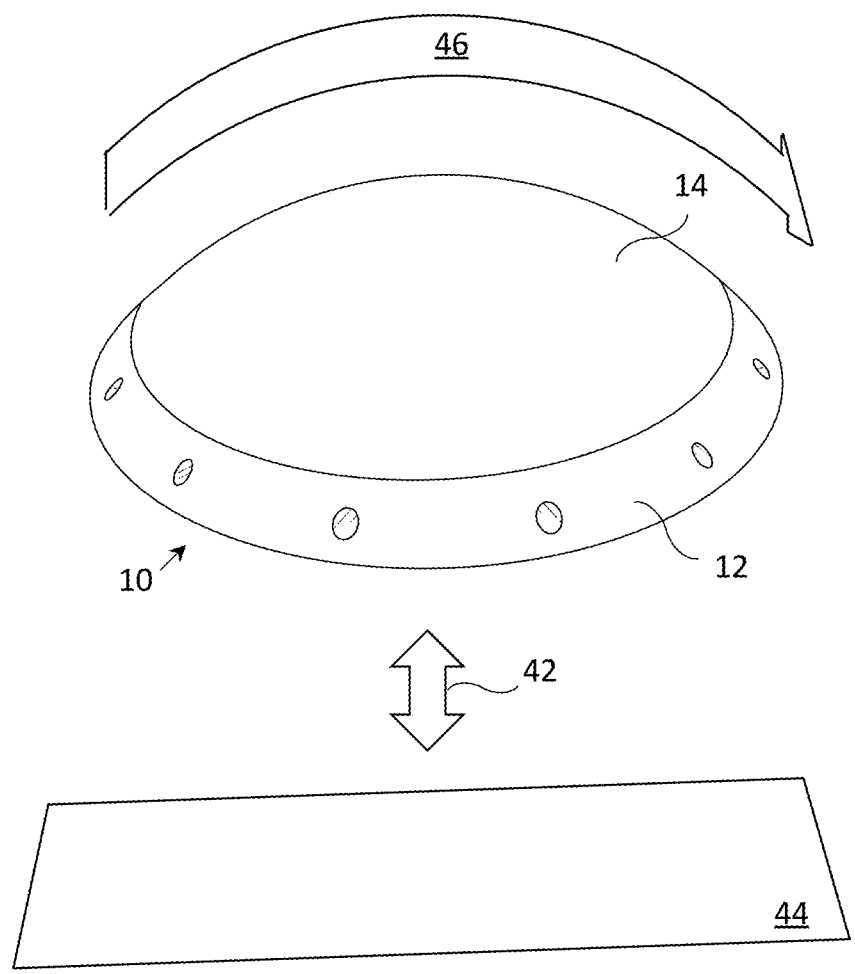
FIG. 1G depicts an aerodynamic interface and a mounting interface of the monitoring device, in accordance with one embodiment of the invention.
Figure 1H:
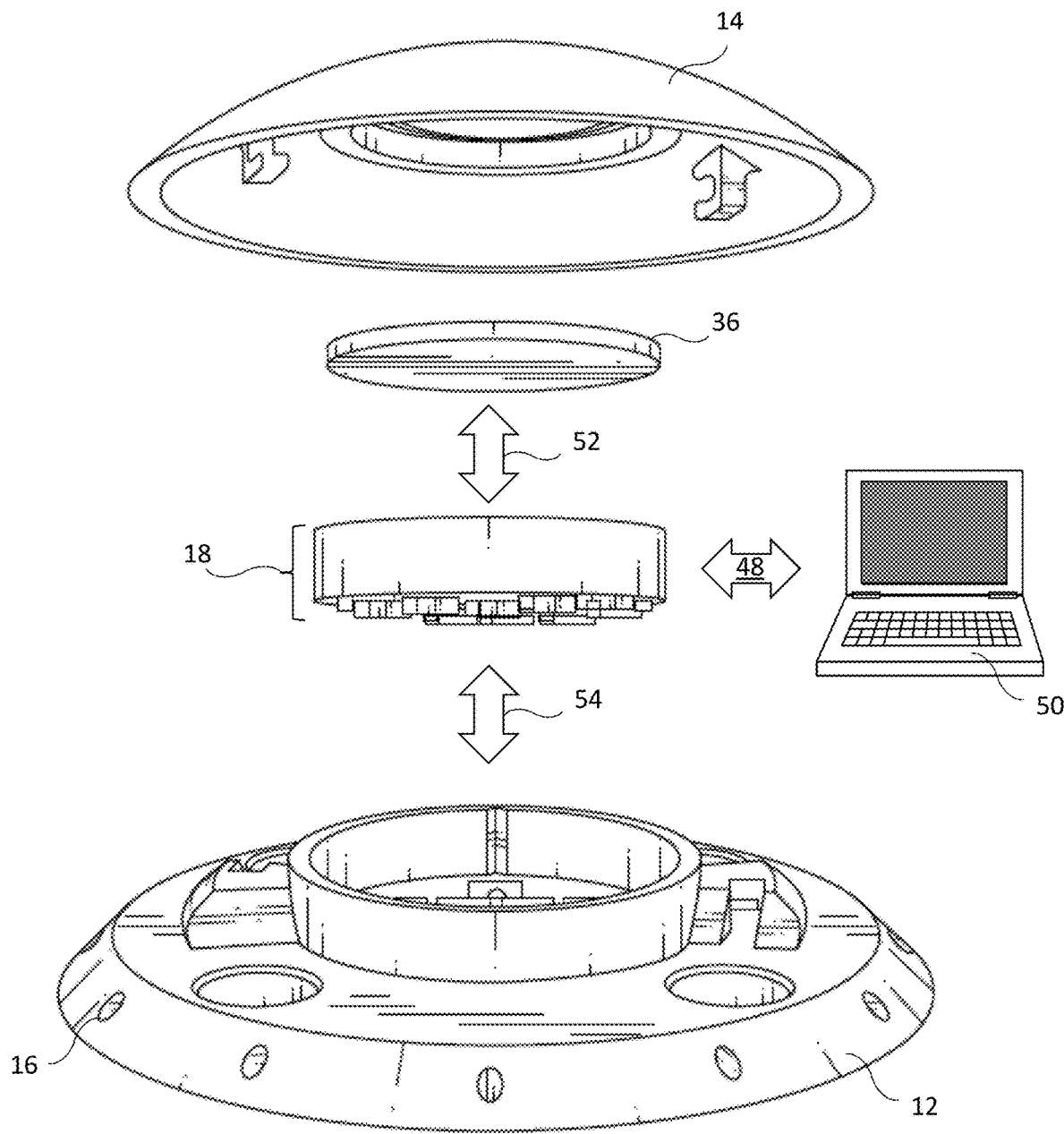
FIG. 1H depicts an input/output (I/O) interface, a power interface and a sensor interface of the monitoring device, in accordance with one embodiment of the invention.

Monitoring device 10 may be constructed with a modular design, allowing some parts to be substituted with other parts to vary and/or adapt the functionality of monitoring device 10. The modular design may conceptually be organized in a plurality of interfaces, which will be described in more detail below in FIGS. 1G and 1H. Mounting interface 42 and aerodynamic interface 46 are depicted in FIG. 1G, while input/output (I/O) interface 48, power interface 52 and sensor interface 54 are depicted in FIG. 1H.

Mounting interface 42 may refer to the interface between monitoring device 10 and any surface to which it is mounted. Mounting interface 42 may allow one monitoring device 10 to be swapped with another monitoring device 10. Additionally, details such as the above-described mounting mechanism (e.g., screws, glue, etc.) used to secure monitoring device 10 to mounting surface 44 may be conceptually regarded as being part of mounting interface 42.

Aerodynamic interface 46 may refer to the interface between monitoring device 10 and the fluid that flows around or near monitoring device 10. Aerodynamic interface 46 may be identical to the above-described flow-facing surface of monitoring device 10 that may be formed by one or more of aeroshell 14 and cavity assembly 12. The shape of aerodynamic interface 46 may influence the flow characteristics that can be measured. Various contours (whether conical, domed, flat, etc.) of aerodynamic interface 46 are possible and are depicted in the various figures. In the configuration of aerodynamic interface 46, one aeroshell of monitoring device 10 may be swapped with another aeroshell (and/or one cavity assembly 12 may be swapped with another cavity assembly), while keeping all other components of monitoring device 10 unchanged. In other embodiments (e.g., in FIG. 3B), no aeroshell 14 may be present, and in such embodiments, the contour of cavity assembly 12 may completely configure aerodynamic interface 46.

I/O interface 48 may refer to the communication interface between sensor module 18 and computing device 50 (e.g., laptop, smartphone, desktop, server, etc.) external to sensor module 18. By default, the I/O interface is a wireless interface, and different communication standards (e.g., Wi-Fi or Bluetooth) may be employed to suit different data communication requirements. Alternatively, the I/O interface may be a wired interface, such as a USB interface, a small computer system interface (SCSI), etc. The measured velocity of the fluid flow (e.g., including speed and/or direction) may be transmitted from sensor module 18 to computing device 50 via I/O interface 48. In addition, the firmware of a microcontroller of sensor module 18 may also be updated wirelessly via I/O interface 48 using standard over-the-air technology. Features can be introduced or software maintenance can be performed without opening the device. In addition, I/O interface 48 may allow one computing device to be swapped with another computing device, while keeping all other components of the monitoring system unchanged.

Power interface 52 may refer to the interface between a power supply (e.g., a rechargeable or non-rechargeable battery) and the other components of sensor module 18. Power interface 52 may allow the power source of monitoring device 10 to be swapped with a different power source, while keeping all other components of monitoring device 10 unchanged.

Sensor interface 54 may refer to the interface between sensor module 18 and cavity assembly 12. Sensor interface 54 may allow one sensor module of monitoring device 10 to be swapped with a different sensor module, while keeping all other components of the velocimeter unchanged. Occasionally, sensor interface 54 may need to be cleaned by removing foreign matter (e.g., dust, insects, etc.) that may have become lodged within one or more of the cavities 24 and/or channels 40. As should be apparent, these above-described interfaces isolate various functions of the monitoring device and permit components of the monitoring device to be swapped in order to configure the monitoring device for different use cases. The remainder of the description provides example configurations of a monitoring device 10, in which one or more of the above-described interfaces may be configured and/or varied.

Figure 2A:
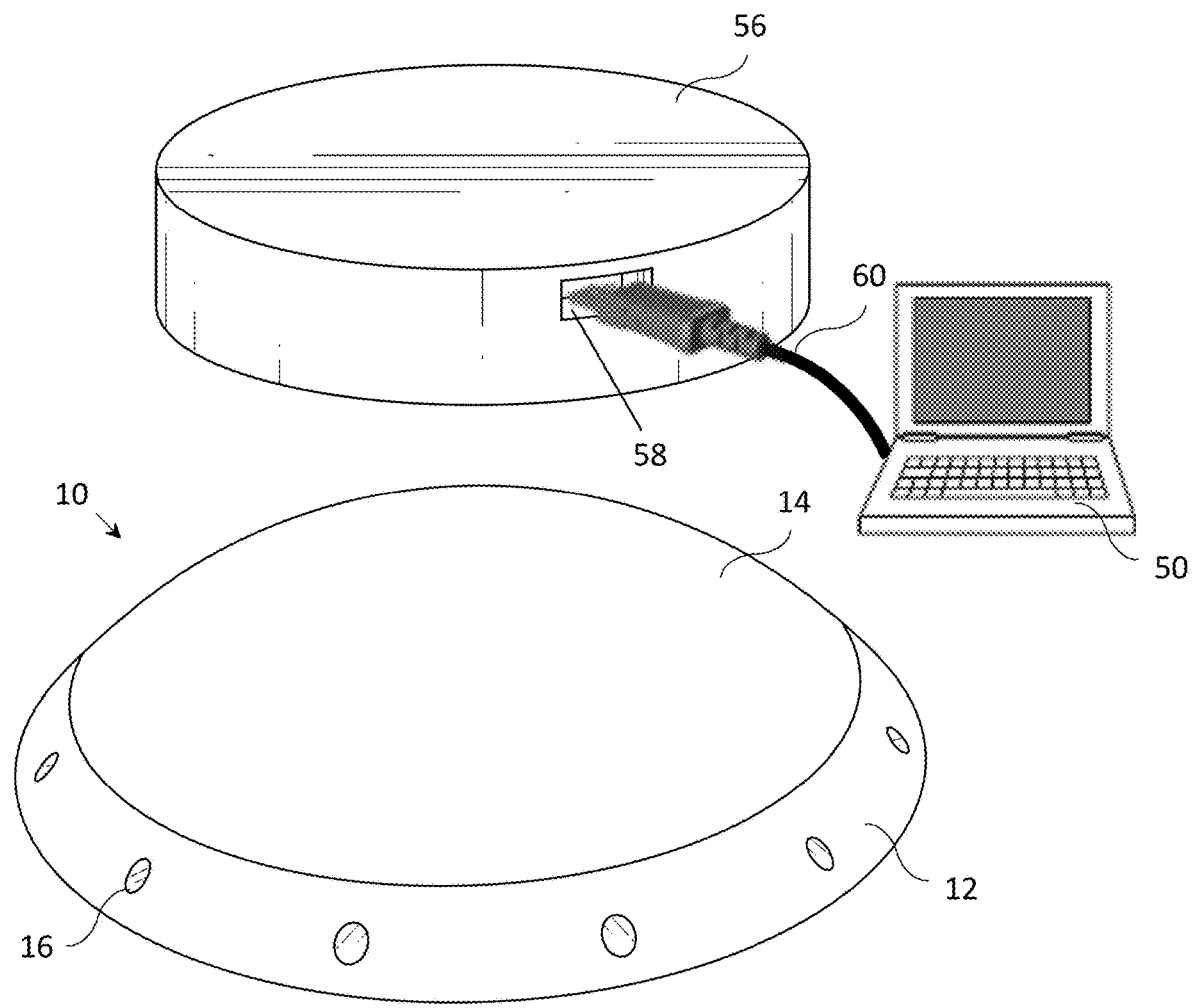
FIG. 2A depicts a perspective view of a wirelessly chargeable monitoring device and a wireless charger for wirelessly (e.g., inductively) charging the monitoring device, in accordance with one embodiment of the invention.
Figure 2B:
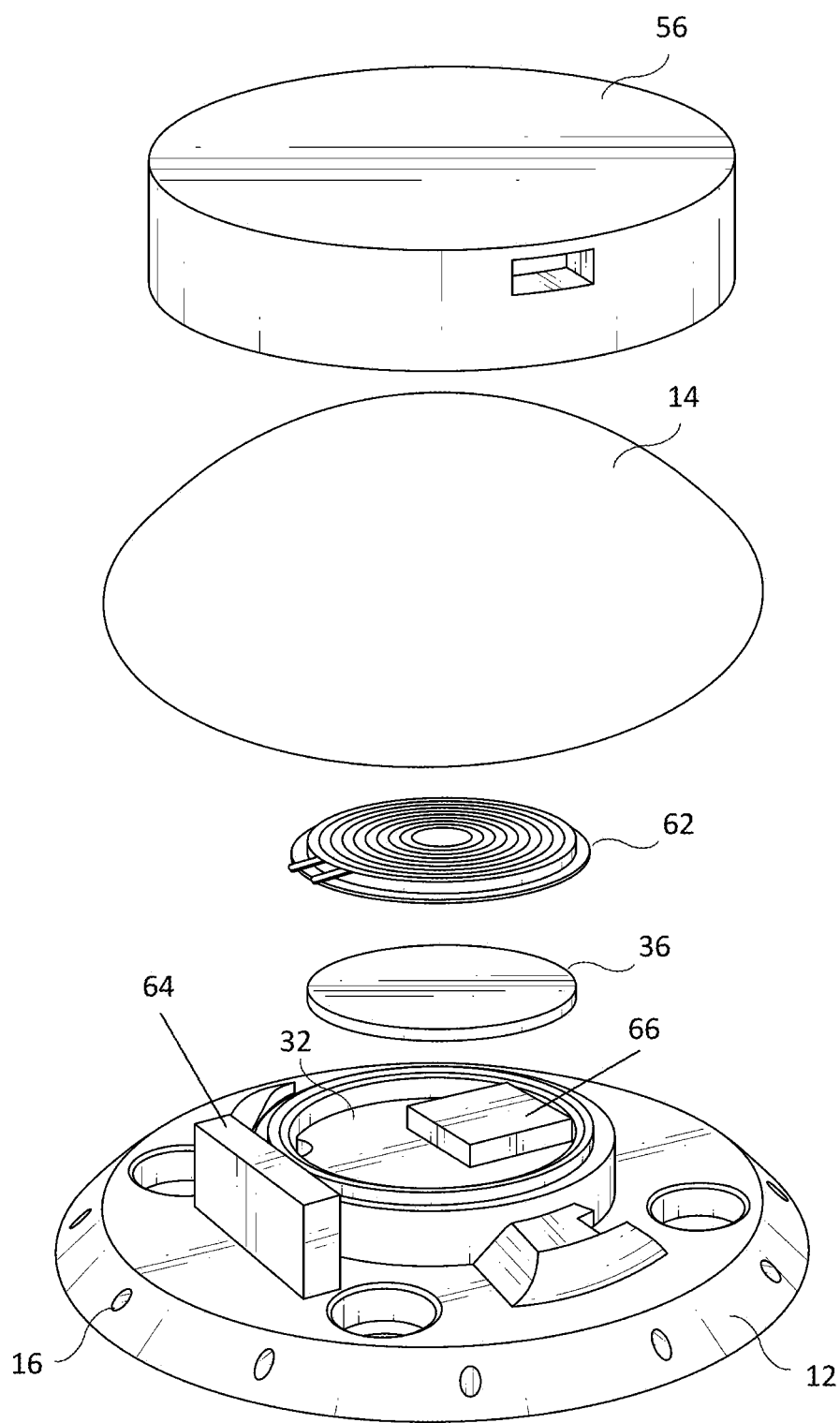
FIG. 2B depicts a modified version of FIG. 2A with an exploded view of the wirelessly chargeable monitoring device, in accordance with one embodiment of the invention.

FIGS. 2A and 2B depict a modification to the power interface of the monitoring device 10 depicted in FIGS. 1A-1H. In the previously described embodiment of monitoring device 10, it was assumed that battery 36 (e.g., a coin type battery such as CR1616) is periodically replaced as the energy stored in battery 36 is depleted. In FIGS. 2A and 2B, battery 36 of monitoring device 10 is configured to be wirelessly (e.g., inductively) charged by wireless charger 56. An advantage to such a monitoring device 10 is that the monitoring device 10 need not to be opened when the power runs out, and in fact, the enclosure of the monitoring device 10 can be sealed shut to help maintain a continuous flow-facing interface.

FIG. 2A depicts monitoring device 10 that is located near a wireless charger 56, enabling monitoring device 10 to be wirelessly charged by wireless charger 56. In one embodiment, power may be supplied to wireless charger 56 from computing device 50 via USB port 58 of wireless charger 56 and USB cable 60. Of course, other ports and cables may be used to supply power to wireless charger 56. In another embodiment (not depicted), wireless charger 56 may be directly plugged into an electrical 110V (or 220 V) outlet.

FIG. 2B depicts an exploded view of monitoring device 10 showing some of the components that enable monitoring device 10 to be wirelessly charged. Wireless charger 56 may include a transmitter coil (not depicted) that establishes a charging field with receiving coil 62 located inside of monitoring device 10. Current from receiving coil 62 may be conditioned by a power conditioning board 64 to charge battery 36, which may be a coin-type rechargeable battery (e.g., a lithium battery). In another embodiment (not depicted), battery 36 may be a lithium battery in a flexible polymer foil package. Integrated circuit 66 of sensor board 32 (e.g., comprising a processor, wireless transmitter/receiver, and flash memory) is visible in FIG. 2B. It is noted that, in other embodiments (not depicted), it is possible for processor, wireless transmitter/receiver and flash memory to each be a discrete integrated circuit component, rather than being integrated into a single integrated circuit 66.

Figure 3A:
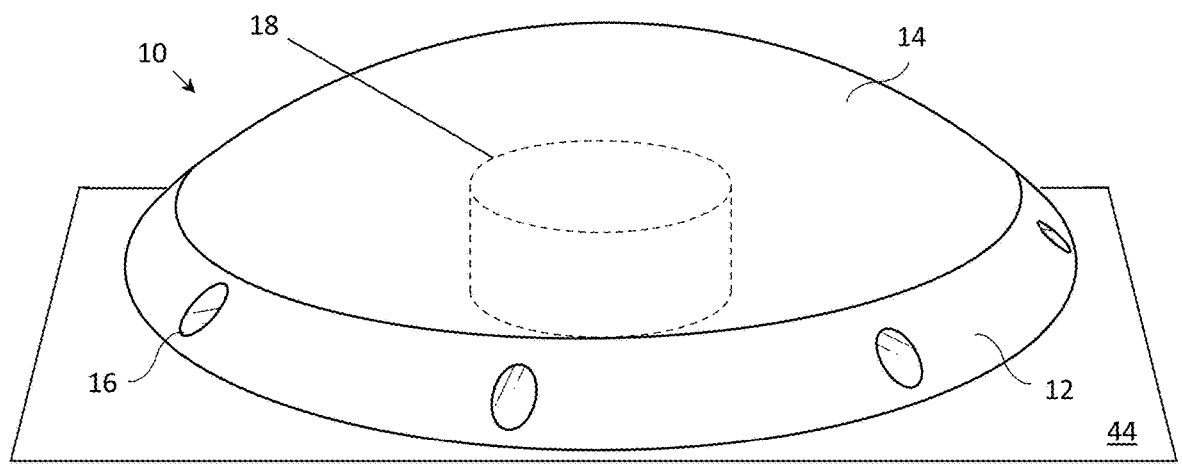
FIG. 3A depicts a perspective view of monitoring device in which sensors of the sensor module face towards a mounting surface, in accordance with one embodiment of the invention.
Figure 3B:
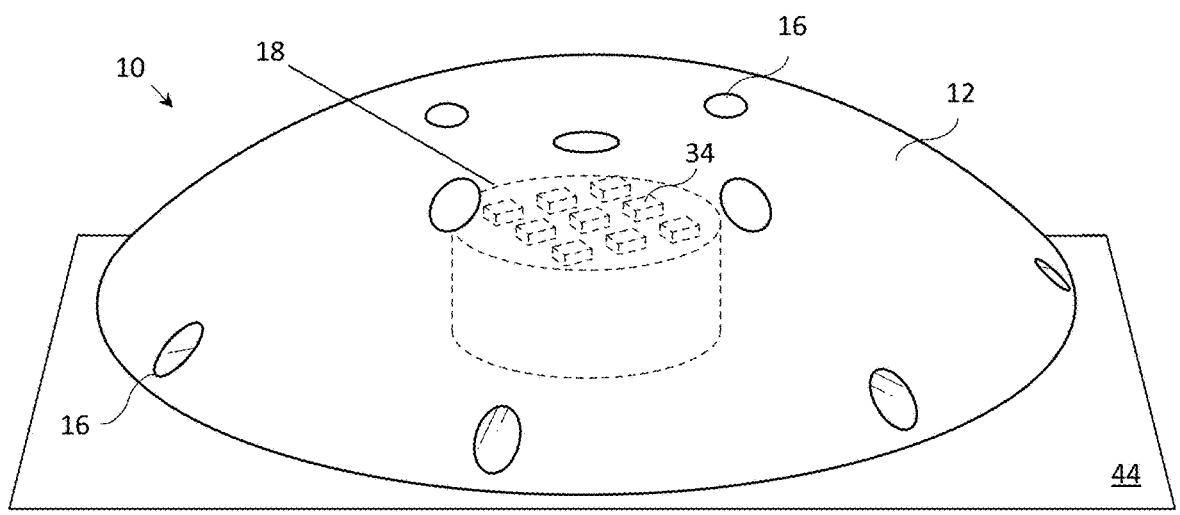
FIG. 3B depicts a perspective view of a monitoring device in which sensors of the sensor module face away from a mounting surface, in accordance with one embodiment of the invention.

FIGS. 3A and 3B depict variations of the aerodynamic interface, which may determine the types of attributes (e.g., velocity relative to a primary flow direction or relative to distance from the mounting surface) that are measured from the fluid flows. The aerodynamic interface may, along with mounting surface 44, encapsulate sensor module 18. To maximize configurability (and minimize cost), a common sensor module may be placed within different enclosures chosen per the measurement goals. The aerodynamic interface may be formed from separate parts (e.g., aeroshell 14 and cavity assembly 12), as shown by the example in FIG. 3A. In such an embodiment, sensor module 18 may be inverted (i.e., with the sensors—not visible—facing downwards toward cavity assembly 12) to facilitate port placement along the flow-facing surface of cavity assembly 12. In another embodiment, the aerodynamic interface may be formed from a single component, as shown by the example in FIG. 3B. In such an embodiment, cavity assembly 12 is shaped to encapsulate sensor module 18 over mounting surface 44. With sensors 34 facing upwards towards cavity assembly 12, ports 16 can be located at any location on flow-facing surface of cavity assembly 12. While only sensor module 18 has been depicted in dashed line, it is understood that other previously described components (e.g., battery 36, channels 40, etc.) may also be included within monitoring device 10, even though they are not depicted for ease of illustration.

Figure 4A:
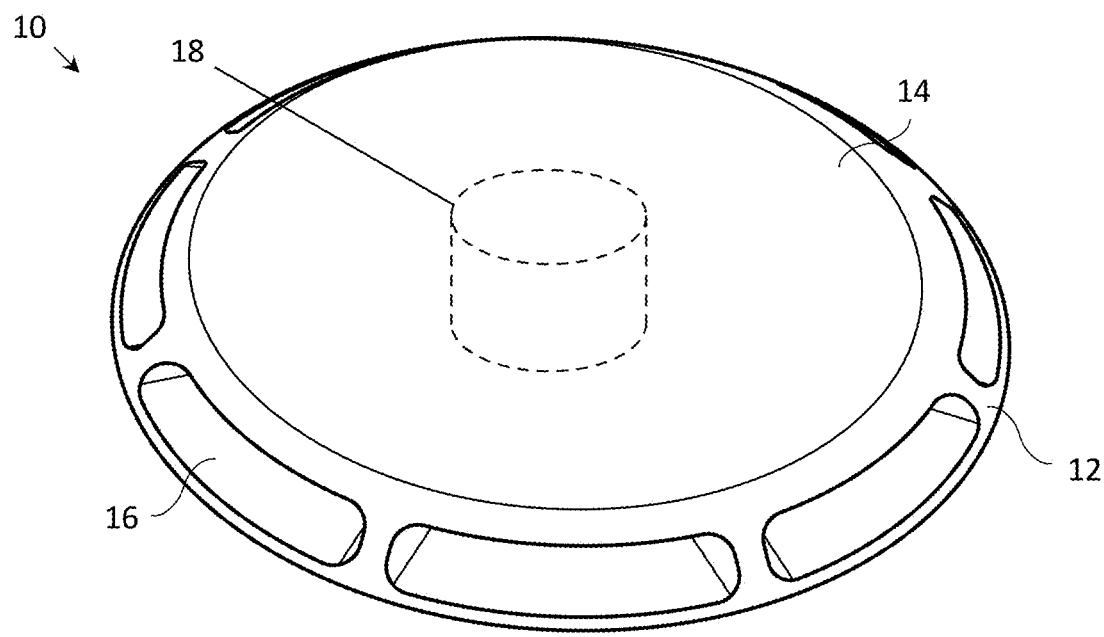
FIG. 4A depicts a perspective view of a monitoring device with slot-shaped ports, in accordance with one embodiment of the invention.
Figure 4B:
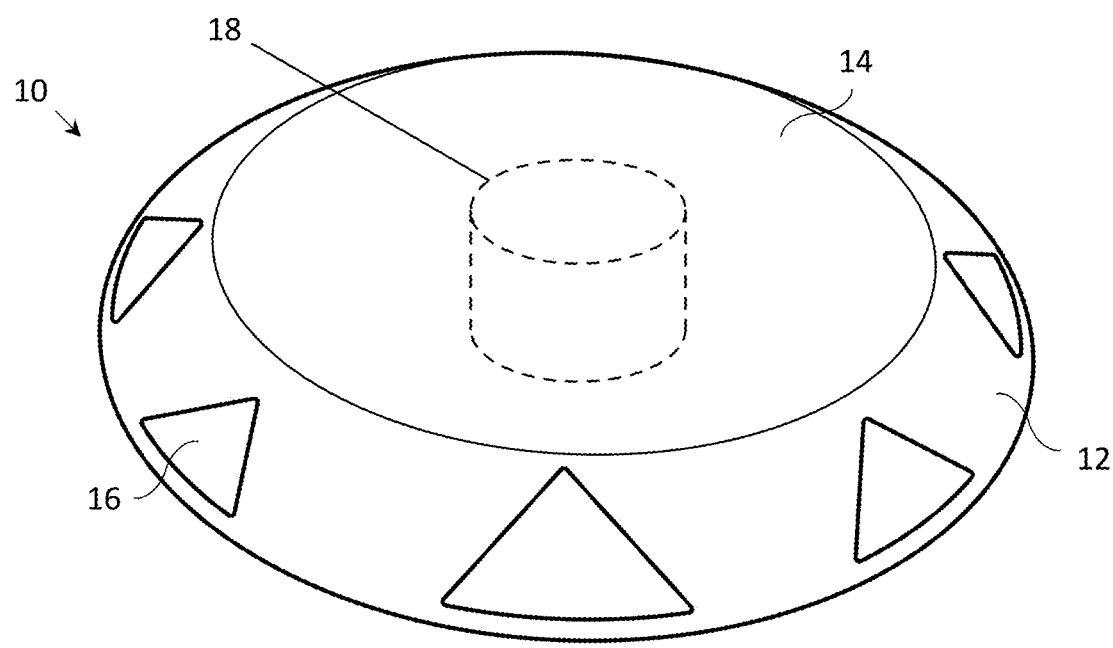
FIG. 4B depicts a perspective view of a monitoring device with triangular-shaped ports, in accordance with one embodiment of the invention.

FIGS. 4A and 4B depict variations in the port geometry of the aerodynamic interface. FIG. 4A depicts a monitoring device with slot- or oval-shaped ports, while FIG. 4B depicts a monitoring device with triangular-shaped ports. The size and shape of the ports (e.g., slot, triangle) can be varied for different velocity accuracy.

Figure 5:
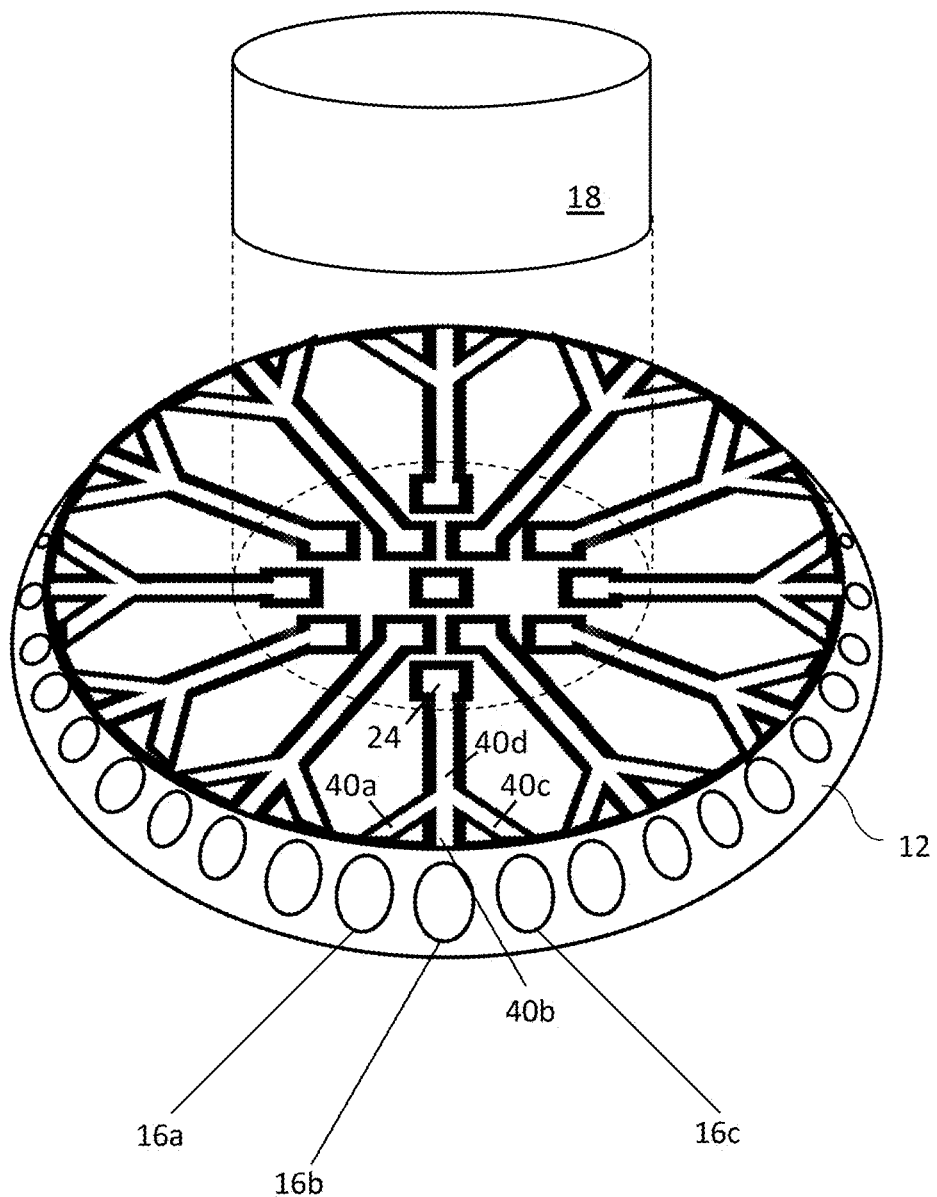
FIG. 5 depicts a cutaway view of a monitoring device with compound ports in which the structure of the respective channels are visible, in accordance with one embodiment of the invention.

FIG. 5 depicts additional variations to the aerodynamic interface in terms of how the ports correspond to the respective cavities. In the previously described embodiments, a single port was fluidly coupled to a single cavity. However, in the "compound port" embodiment of FIG. 5, multiple ports may be connected to a single cavity. For example, as shown in FIG. 5, ports 16a, 16b and 16c may be all fluidly coupled to cavity 24. In particular, subchannels 40a and 40d may fluidly couple port 16a to cavity 24, subchannels 40b and 40d may fluidly couple port 16b to cavity 24; and subchannels 40c and 40d may fluidly couple port 16c to cavity 24. In such an embodiment, the pressure within a single cavity may be influenced by the air flow proximate to a plurality of ports.

Figure 6B:
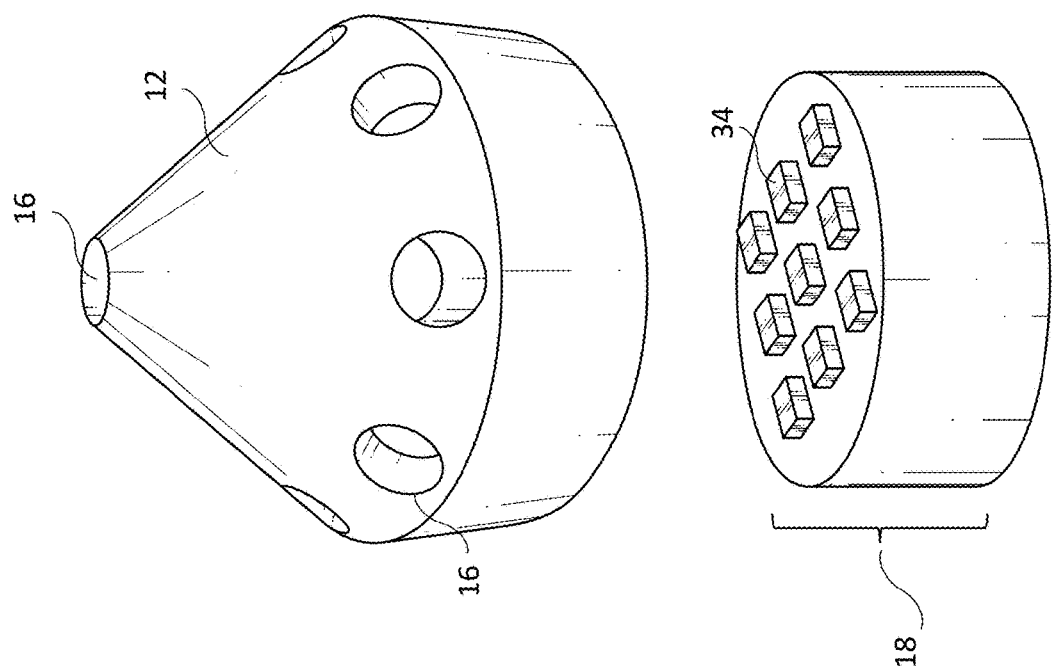
FIG. 6B depicts a partially exploded view of the monitoring device of FIG. 6A, in accordance with one embodiment of the invention.
Figure 6A:
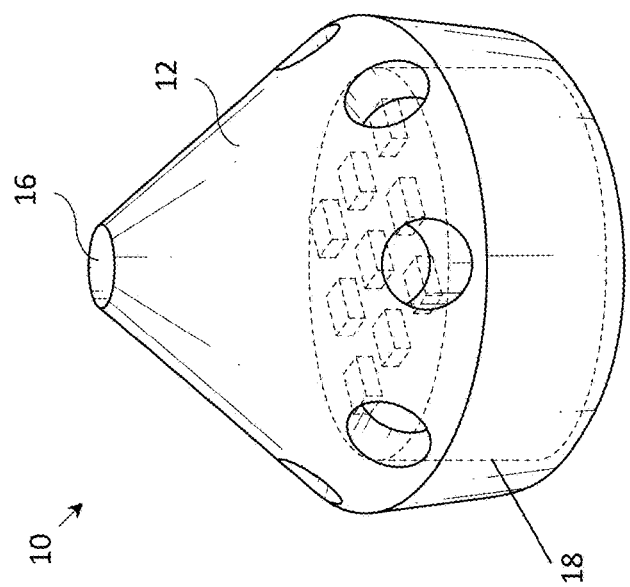
FIG. 6A depicts a perspective view of a monitoring device with a conical aerodynamic interface, in accordance with one embodiment of the invention.

FIGS. 6A and 6B depict additional variations to the aerodynamic interface, in which the earlier described domed-shaped aerodynamic interface is replaced with a conical-shaped aerodynamic interface. FIG. 6A depicts cavity assembly 12 with ports 16 arranged along a circumference of the conical surface, as well as one port 16 located at the tip of the conical surface. Sensor module 18 (with sensors 34 facing away from the mounting surface) can be seen in dashed lines within cavity assembly 12. For increased clarity in illustration, cavity assembly 12 and sensor module 18 are depicted separately from one another in FIG. 6B.

Figure 7B:
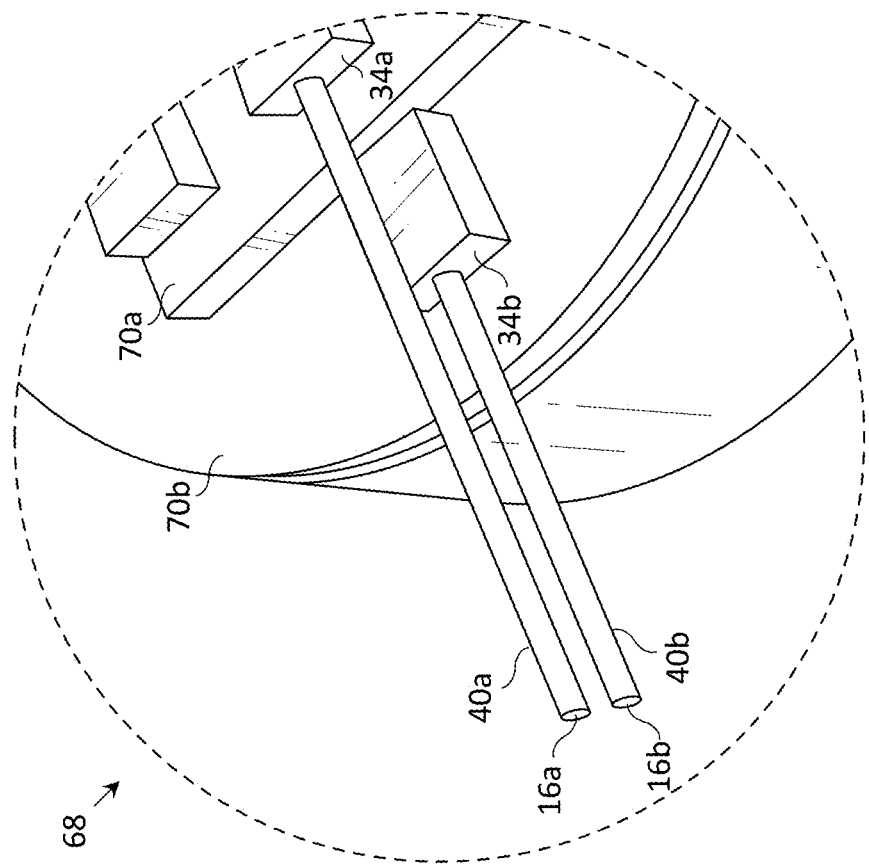
FIG. 7B depicts a magnified view of a portion of FIG. 7A, in accordance with one embodiment of the invention.
Figure 7A:
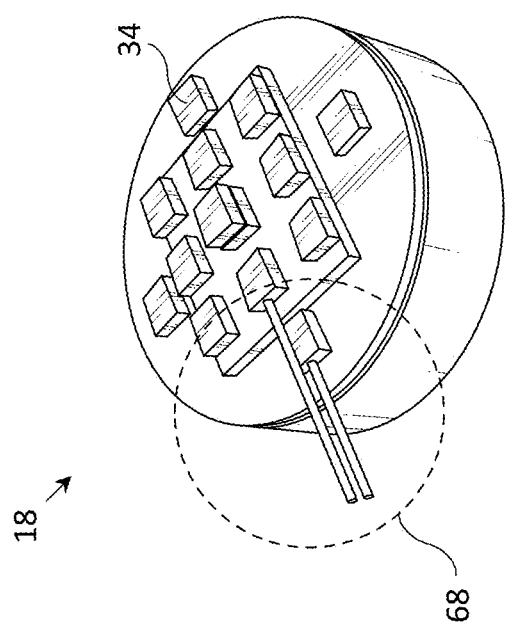
FIG. 7A depicts a sensor module in which the sensors are disposed on different horizontal planes, in accordance with one embodiment of the invention.

FIGS. 7A and 7B depict variations to the sensor interface of the monitoring device, in which a first subset of the sensors are mounted on planar surface 70a and a second subset of the sensors are mounted on planar surface 70b, planar surface 70a and planar surface 70b being disposed at different elevations. For example, sensor 34a may be mounted on planar surface 70a, and sensor 34b may be mounted on planar surface 70b. Mounting sensors 34a, 34b on different planar surfaces adds a degree of freedom to the placement of the sensors, as compared to the default arrangement with all sensors being disposed on a single planar surface.

Depending on the placement of ports on the aerodynamic interface, it may be complicated to route the flow channels between the ports and the sensors, under the constraint that flow channels be kept short and straight to facilitate manufacture and maintenance (e.g., to clean them, if necessary). Notice in the example of FIG. 7B how ports 16a and 16b are stacked vertically on top of one another. By placing sensors 34a, 34b on different planar surfaces, flow channels 40a, 40b may be conveniently spaced apart from one another in a direction perpendicular to the planar surfaces.

FIG. 8A depicts additional variations to the aerodynamic interface, in which ports 16a and 16b are spaced apart on a surface of a "rake probe" cavity assembly 12 along line 45 that extends in a direction perpendicular to mounting surface 44. An aerodynamic interface with "vertically" staggered ports may be used when measuring cross-sectional velocities (e.g., surface velocity profiles), and for characterizing the boundary layer (i.e., the layer of fluid in the immediate vicinity of a bounding surface where the effects of viscosity are significant), e.g., for drag. To simplify the connections of sensors to ports, sensor module 18 may be oriented with its sensors facing away from the mounting surface 44.

FIG. 8B depicts a hybrid of the earlier depicted cavity assembly 12a with circumferentially spaced ports and the rake probe cavity assembly 12b. Similarly, in FIG. 8B, ports 16c and 16d are oriented along line 45 that extends in a direction perpendicular to mounting surface 44, while a plurality of ports (including port 16e) are distributed about a plane that is parallel to mounting surface 44. To simplify the connections of sensors to ports, sensor module 18 may be oriented on its "side", with its sensors facing the vertically oriented ports.

FIG. 9A depicts yet another variation in the aerodynamic interface, in which monitoring device 10 has a thin profile. This thin profile is useful for higher speed flows (e.g., >20 m/s), because wake turbulence is effectively eliminated by the thin profile. On the other hand, the thin profile is less effective for measuring flows with a slow speed (e.g., <20 m/s). Monitoring device 10 of FIG. 9A comprises cavity assembly 12 which forms the flow-facing surface of the monitoring device. The flow-facing surface (i.e., the surface of cavity assembly 12 that is exposed to the fluid flow) may be oriented substantially parallel to the mounting surface 44, as shown in FIG. 9A. Cavity assembly 12 may include a plurality of ports 16 and a plurality of cavities 24. While not depicted in FIG. 9A, it is understood that ports 16 are connected to the cavities 24 by channels, in a similar manner as that depicted in FIG. 1E. Cavities 24, located within cavity assembly 12, are not visible in the perspective view of FIG. 9A and hence are depicted in dotted line. Similar to the monitoring device depicted in FIGS. 1A-1H, cavities 24 of cavity assembly 12 may individually contain a corresponding sensor 34 of sensor module 18. No aeroshell may be included in the aerodynamic interface of the monitoring device of FIG. 9A.

FIG. 9B depicts monitoring device 10 with cavity assembly 12 removed to illustrate the internal components (e.g., sensor module 18 and backing member 74) of monitoring device 10. Conceptually, one can imagine cavity assembly 12 like a shoebox that encloses sensor module 18 and backing member 74. Using the shoebox analogy, FIG. 9B depicts the contents of the shoebox, with the shoebox lid removed. Sensor module 18 may include sensor board 32 (with a plurality of sensors disposed thereon), receiving coil 62 (i.e., to receive inductively transmitted energy) and batteries 36a/b/c. These components of sensor module 18 may be arranged in a "side-by-side" manner (rather than in a vertically stacked configuration) on backing member 74 to accommodate the thin profile. It is important to note that sensor module 18 depicted in FIG. 9B may include the same (or similar) components as the stacked-assembly sensor module 18 depicted in FIG. 2B, but instead of being stacked, the components are "unstacked" and laid on a surface of backing member 74.

The thin profile not only provides the advantage of minimizing the disruption to the fluid flow, but in some embodiments also provides the ability for monitoring device 10 to flex and conform to a non-planar contour of the mounting surface 44, as shown in FIG. 9C. It is noted that no gap is present between monitoring device 10 and non-planar mounting surface 44 in FIG. 9C. The flexibility of the monitoring device is not only provided by its thin profile, but also in how its components are fabricated. In one embodiment, backing member 74 and cavity assembly 12 may be printed using flexible media, allowing the thin-profile device to bend along (non-flexible) component boundaries. In another embodiment, further flexibility may be provided with sensor board 32, receiving coil 62 and battery 36 also fabricated using a flexible material. For example, sensor board 32 may be made from a flexible circuit board, and batteries 36a/b/c may be flexible lithium ion pouch batteries. In such an embodiment, the entire monitoring device may be flexible, similar to a sheet of paper. Moreover, inductive recharging eliminates the need to replace the batteries, allowing the components to be permanently encapsulated within the thin-profile device.

In other embodiments (not depicted), backing member 74 may be omitted, and sensor board 32, receiving coil 62, and one or more flexible lithium ion pouch batteries 36a/b/c may be directly mounted onto mounting surface 44 (e.g., using an adhesive) to further decrease the thickness (or height) of the thin-profile device. In such an embodiment, one can imagine cavity assembly 12 to resemble only the lid of a shoebox, and such lid can be placed directly over the sensor module components that have been directly mounted onto mounting surface 44.

As may be apparent, there may be tradeoffs between the height (also referred to as thickness) and the footprint of a monitoring device. The reduced height of a thin-profile monitoring device may cause less disruption to the fluid flow, with the potential drawback of a larger footprint. On the other hand, the taller height of a stacked assembly may cause more disruption to the fluid flow, but have the potential benefit of a smaller footprint.

As will be more clearly explained below, a thin-profile monitoring device may be part of a "tiled" or mosaic arrangement, such that electrical signals and even power may be transmitted from one thin-profile monitoring device to an adjacently located thin-profile monitoring device. Electrical ports 72 disposed on a side surface of monitoring device 10 may be configured to communicate data signals and/or supply power to monitoring device 10 from an adjacent device (not depicted). Alternatively, or in addition, the electrical ports 72 may be configured to communicate data signals and/or supply power from monitoring device 10 to an adjacent device (not depicted). These electrical ports may include mechanical linkages (e.g., plug and socket) to secure the electrical connections.

Figure 10B:
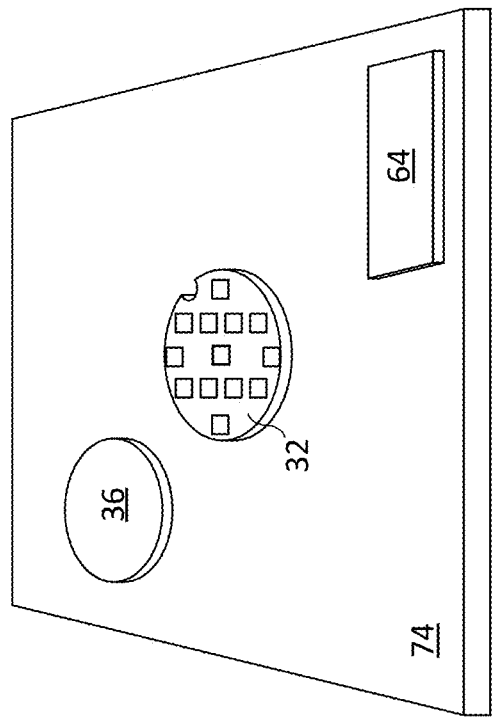
FIG. 10B depicts internal components of the monitoring device of FIG. 10A, in accordance with one embodiment of the invention.
Figure 10A:
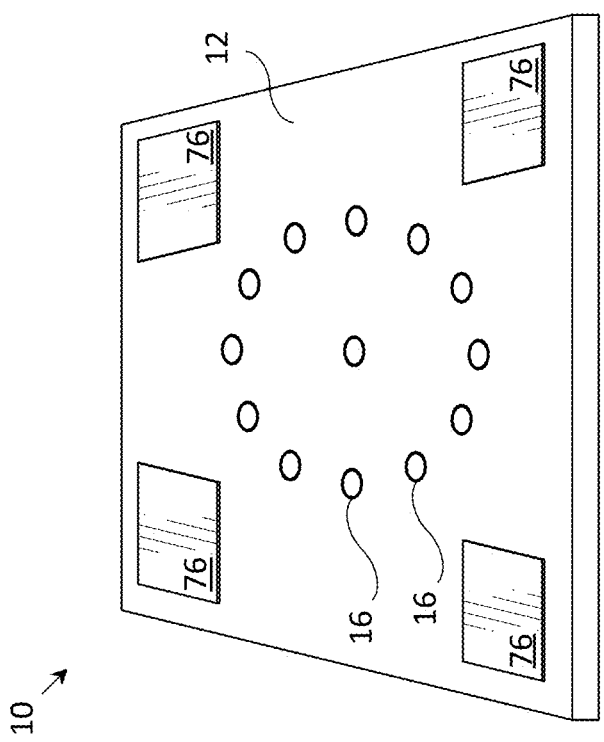
FIG. 10A depicts a solar rechargeable version of the monitoring device of FIG. 9A, in accordance with one embodiment of the invention.

FIG. 10A depicts a solar rechargeable version of a thin-profile monitoring device. In the solar rechargeable version, one or more solar panels 76 may be disposed on the flow-facing surface of monitoring device 10. FIG. 10B depicts the internal components of the monitoring device of FIG. 10A, including battery 36, sensor board 32 and power conditioning board 64 that are arranged in a side-by-side manner on backing member 74. Solar energy that is received by solar panels 76 may be converted to AC or DC power by power conditioning board 64, before the harvested energy is provided to and consumed by components of sensor board 32.

Figure 11:
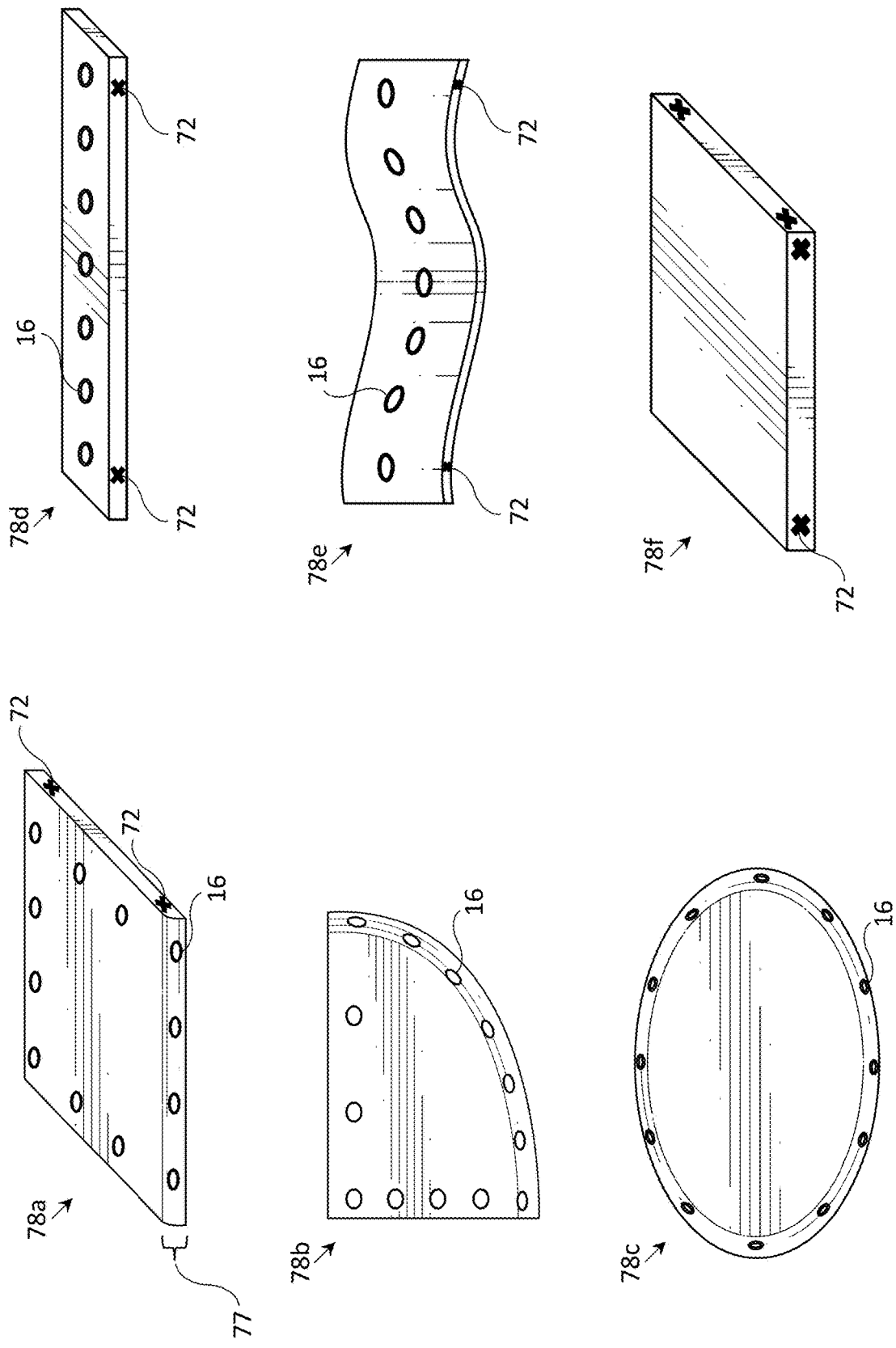
FIG. 11 depicts various thin-profile components that are arrangeable over a surface to collectively form a monitoring device, in accordance with one embodiment of the invention.

FIG. 11 depicts various possible shapes/geometries of thin-profile components, also called "velocimeter tiles" or "tiles". Tiles individually may form a monitoring device (such as in the embodiment of FIGS. 9A-9C), or a group of these tiles may be electrically coupled to one another in a "mosaic" (also called a "velocimeter mosaic") to form a single monitoring device. For instance, while the above-described monitoring devices all contained a cavity assembly, a sensor module, an input/output module, and a battery, each tile may or may not contain a cavity assembly, may or may not contain a sensor module, may or may not contain an input/output module, and may or may not contain a battery.

Like floor tiles, velocimeter tiles (whether flexible or rigid) can be made in different shapes and sizes (e.g., rectangles, strips, triangles, hexagons, ovals, etc.). Velocimeter tiles can be shaped to form a tessellation, i.e., to form a mosaic without any gaps. Internal-facing edge faces (i.e., internal with respect to the mosaic) can be squared to permit flush placement against adjacent tiles, whereas edge faces on an external boundary (i.e., external with respect to the mosaic) can have an aerodynamic profile to minimize flow disruption. Tile 78*a* provides an example of an aerodynamic edge profile 77 with a smooth transition (without any kinks) between a top surface of the tile and a side surface of the velocimeter tile. In one embodiment, the flexible tile media can be trimmed with a razor blade or scissors to remove the aerodynamic edge if that edge of the tile is arranged to be adjacent to another tile instead of being externally facing.

Certain shapes may be topologically more suited for tessellation. On the other hand, a tile need not be part of a mosaic, and could be a stand-alone component. For example, an individual tile with aerodynamic edges can measure flows in one location, similar to the velocimeters with a stacked sensor module assembly. The tiles can be electrically interconnected, as described above. To permit a high degree of flexibility and to manage costs, "null" tiles may be present to perform the sole function of conducting data or power through the mosaic (i.e., a "null" tile would only contain wires without any other componentry). Tile 78*b* is an example of a "corner" tile. Tile 78*c* is an example of an oval-shaped tile. Tile 78*d* is an example of a "strip" tile. Tile 78*e* is an example of a strip tile that has been flexed into a non-planar state. Tile 78*f* is an example of a null tile.

Figure 12:
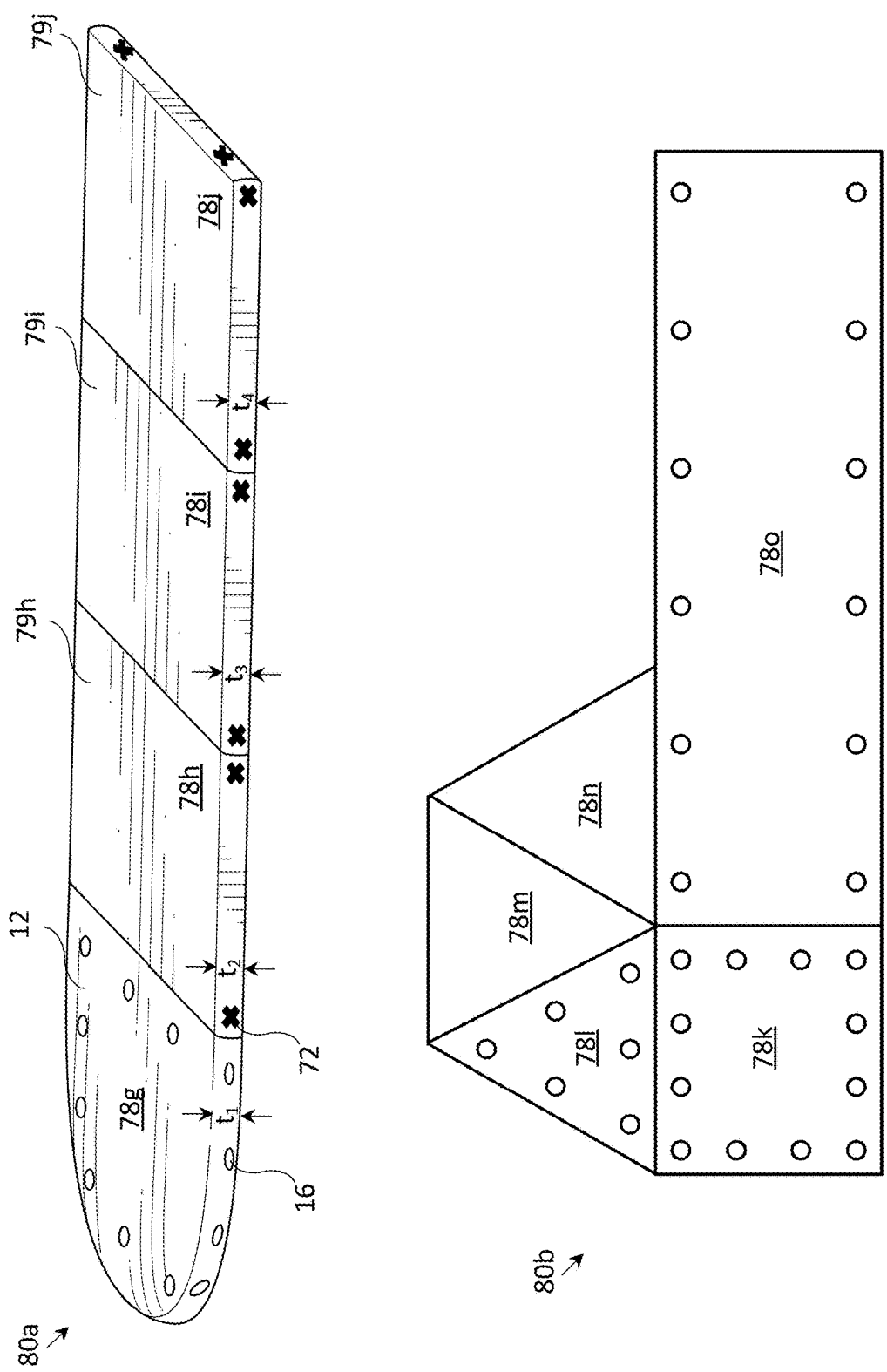
FIG. 12 depicts two monitoring devices that have been constructed using a plurality of non-homogeneous velocimeter tiles, in accordance with one embodiment of the invention.

FIG. 12 depicts two monitoring devices that have been constructed using a plurality of non-homogeneous velocimeter tiles. As such, each of the tiles may not independently function on their own, and instead a collection of disparate ones of the tiles may be required to form a functional monitoring device. Such a design can optimize resource utilization across a mosaic. For example, a processor tile can be shared by many sensor tiles; similarly, a power tile or an I/O tile can be shared by many sensor tiles.

For example, monitoring device 80*a* has been constructed from a plurality of non-homogeneous tiles 78*g*, 78*h*, 78*i* and 78*j*. Sensor tile 78*g* includes cavity assembly 12 and a sensor board with sensors (not depicted) contained within cavity assembly 12 (also referred to as housing). Sensor tile 78*g* may not, however, include a processor, a battery or an I/O module. Processor tile 78*h* includes a processor (not depicted) that is contained within housing 79*h*. Battery tile 78*i* includes only a battery (not depicted) that is contained within housing 79*i*. Similarly, I/O tile 78*j* includes only an I/O module (not depicted) that is contained within housing 79*j*. Cavity assembly 12 may have a thickness of $t_1$; housing 79*h* may have a thickness of $t_2$; housing 79*i* may have a thickness of $t_3$; and housing 79*j* may have a thickness of $t_4$. In one embodiment, the thicknesses, $t_1$, $t_2$, $t_3$ and $t_4$ are all equal to one another to form a smooth flat surface which minimizes the disruption to the fluid flow.

Monitoring device 80*b* also provides another example of a velocimeter mosaic that has been constructed from a plurality of non-homogeneous tiles 78*k*, 78*l*, 78*m*, 78*n* and 78*o*. Tiles 78*k*, 78*l* and 78*o* may be sensor tiles, whereas tile 78*m* may be a processor tile and tile 78*n* may jointly provide power and I/O capabilities.

Figure 13:
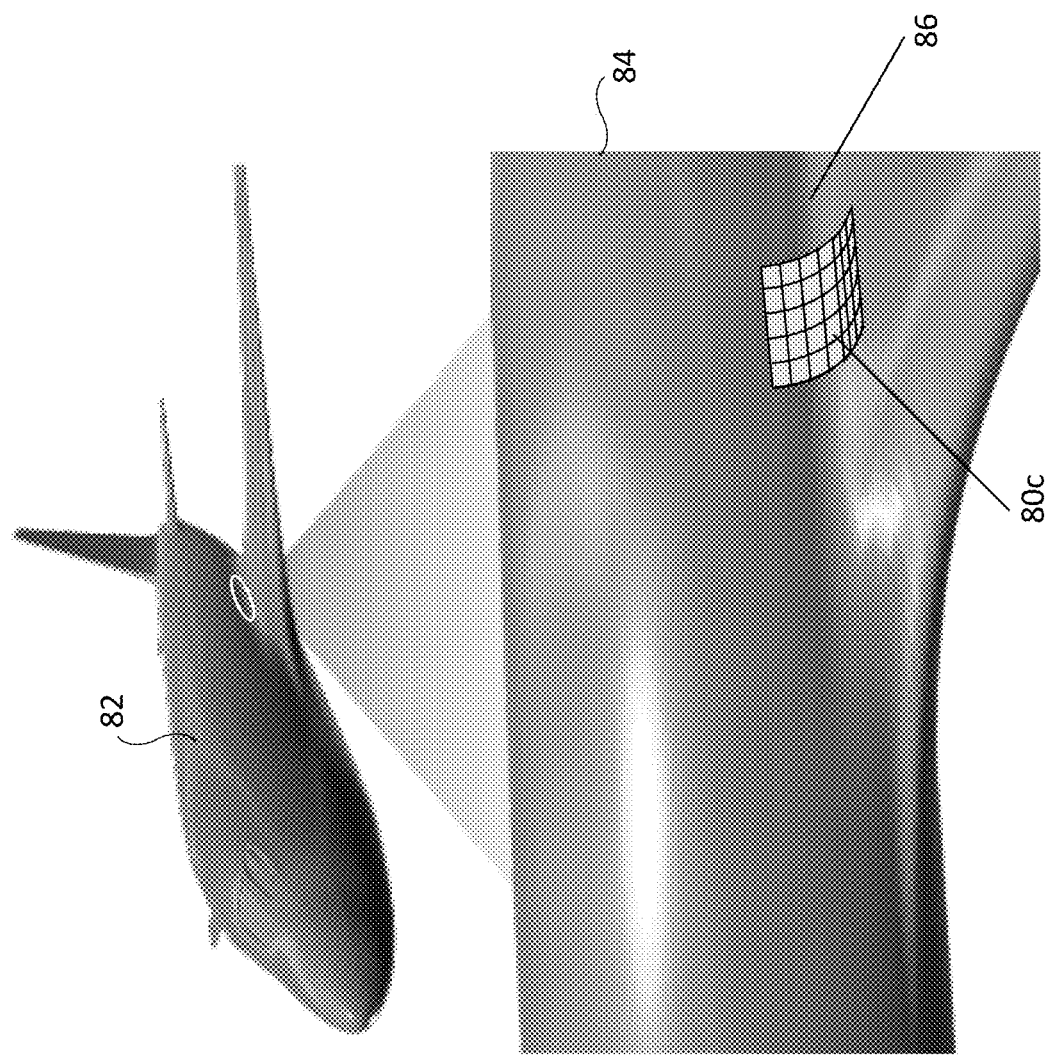
FIG. 13 depicts a monitoring device formed from velocimeter tiles that has been mounted at the wing-root juncture of an airplane, in accordance with one embodiment of the invention.

FIG. 13 depicts an application of mosaic 80*c* to characterize the flow at or near wing-root juncture 86 of airplane 82. Wing-root juncture 86 is shown in greater detail in magnified portion 84 of airplane 82. As shown in the illustration, mosaic 80*c* of rectangular tiles instruments wing-root juncture 86 so that the flow field at this juncture can be characterized. In practice, the flow field at wing-root juncture 86 may be quite dynamic. Accordingly, each tile may use sensitive pressure sensors (e.g., using MEMS technology) to measure the flow at the end of short conduits. As a result, the capture of high resolution data is possible so that the velocity of the dynamic flow can be measured in high resolution.

Figure 14B:
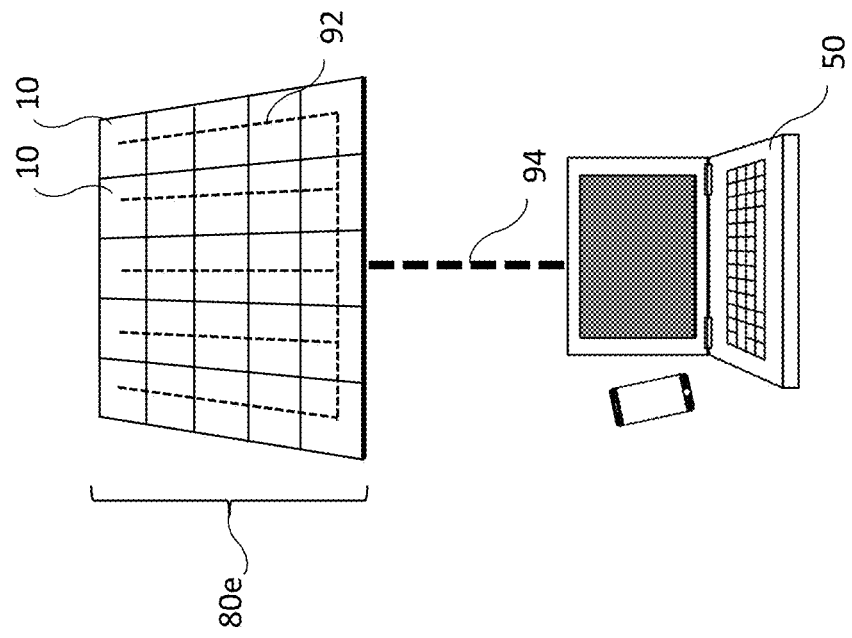
FIG. 14B depicts a monitoring device formed from velocimeter tiles, in which the velocimeter tiles are communicatively coupled to one another, and at least one of the velocimeter tiles is communicatively coupled to a computing device, in accordance with one embodiment of the invention.
Figure 14A:
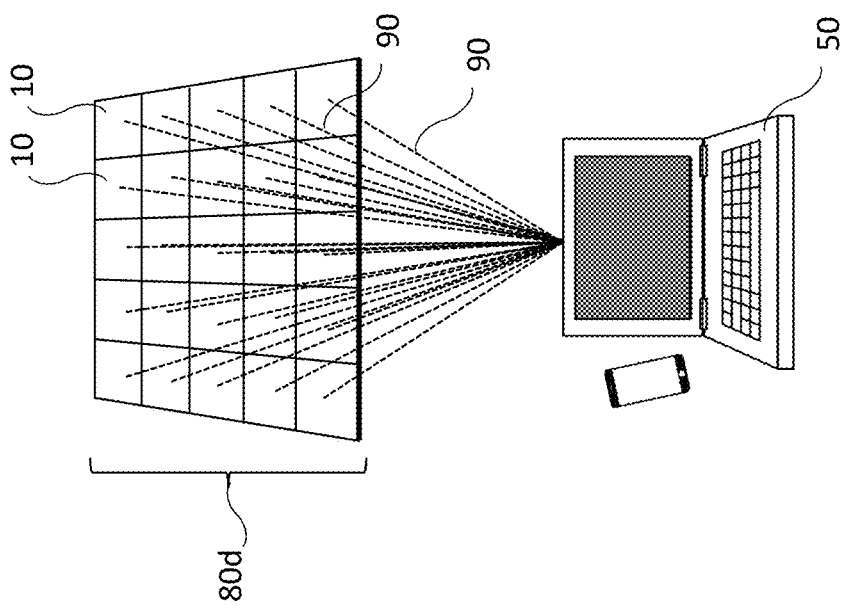
FIG. 14A depicts a monitoring device formed from velocimeter tiles, in which each of the velocimeter tiles are communicatively coupled to a computing device, in accordance with one embodiment of the invention.

FIG. 14A depicts grid mosaic 80*d* of a plurality of flat-profile monitoring devices 10. As mentioned above, each of the flat-profile monitoring devices 10 may be thought of as a "tile", and like the tiles on a floor, these components can be placed adjacent to each other to cover a wide area, with a boundary shape of the grid arrangement limited only by the tile shape. It should be apparent that such a grid arrangement of monitoring devices may have a low, uniform thickness, which minimizes flow disruption. Ports may be disposed on the top surface of the tiles, except for tiles on the boundary of the grid arrangement, in which ports may also be disposed on the outwardly-facing sides of the tiles, in addition to the top surface. The example illustrated in FIG. 14*a* depicts a 5×5 tile grid in which each of the 25 tiles communicates with remote computing device 50 (e.g., PC, smartphone, etc.) via communication paths 90. The remote computing device 50 may be configured to aggregate the data to report on the flow field measured by the entire grid mosaic 80*d*.

FIG. 14B depicts grid mosaic 80*e* of a plurality of tiles 10, in which the tiles are configured as a mesh-type network. Data from the tiles 10 may be cascaded and aggregated together at one or more of the tiles 10 via communication path 92 before being transmitted to remote computing device 50 (e.g., PC, smartphone, etc.) via communication path 94. The design depicted in FIG. 14B simplifies the network topology and increases the possible scale, but at the cost of the mesh network overhead.

Figure 15:
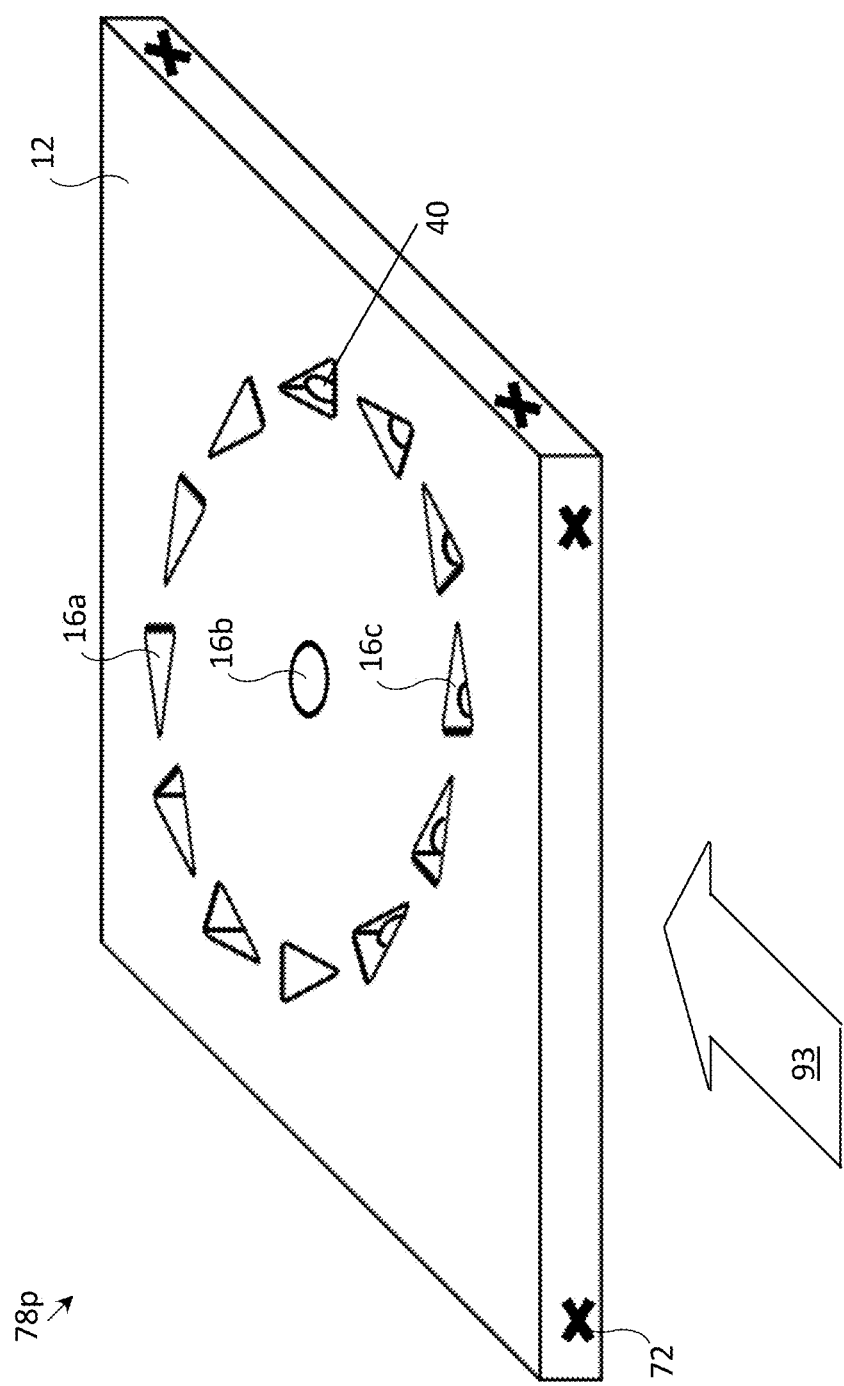
FIG. 15 depicts a perspective view of a thin-profile component with an arrangement of ports, in which each of the ports is disposed on a common surface of the thin-profile component and has a distinct orientation on the common surface, in accordance with one embodiment of the invention.

FIG. 15 depicts a perspective view of thin-profile component 78*p* with a particular arrangement of ports on a common surface of the cavity assembly 12 of the thin-profile component 78*p*. A central circular-shaped port 16*b* may be surrounded by a plurality of "angled" (or triangular) ports (e.g., 16*a*, 16*c*) disposed about a circumference of a circle. Each of the angled ports may have a distinct orientation (with respect to other angled ports) on the common surface. This arrangement of ports permits each port to interact differently with a laminar (horizontal) flow 93 across the tile surface, resulting in a pressure pattern (e.g., pressure measurements from all pressure sensors at a particular time instant) that is dependent on the flow direction, as will be shown in FIG. 19B. Channel 40 may be seen within some of the ports. As previously described, channel 40 connects one of the ports with one of the cavities (not depicted) within thin-profile component 78*p*.

Figure 16B:
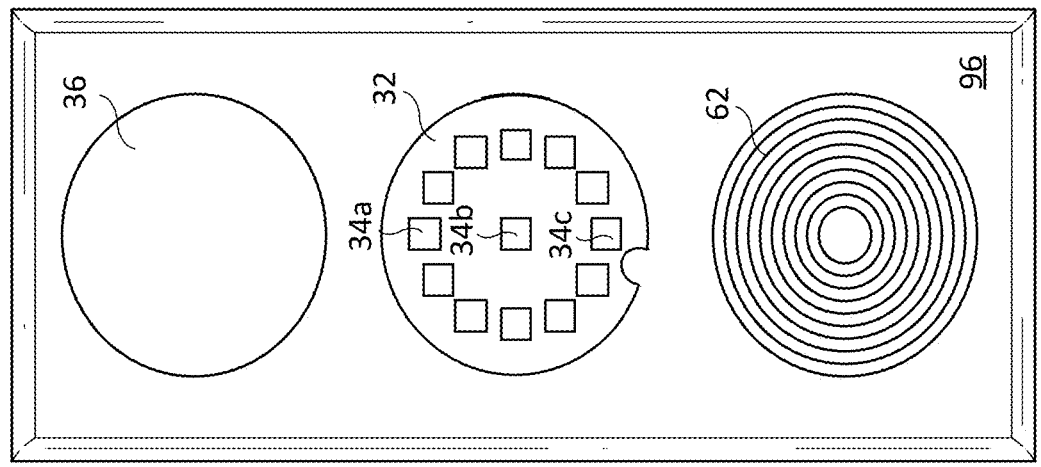
FIG. 16B depicts a top view of the internal components of the thin-profile monitoring device of FIG. 16A, in accordance with one embodiment of the invention.
Figure 16A:
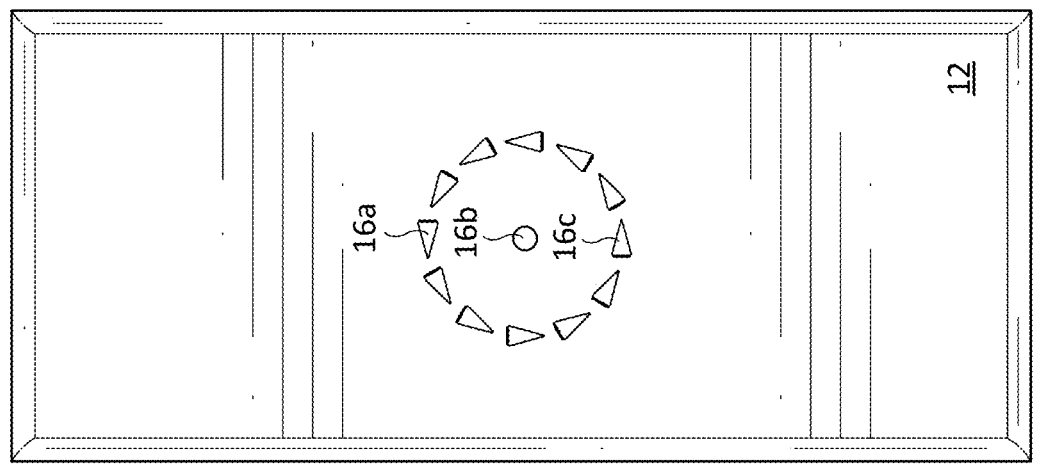
FIG. 16A depicts a top view of a thin-profile monitoring device with an arrangement of ports, in which each of the ports is disposed on a common surface of the thin-profile monitoring device and has a distinct orientation on the common surface, in accordance with one embodiment of the invention.

FIG. 16A depicts a top view of thin-profile monitoring device 10 with the same arrangement of ports as the thin-profile component 78*p* of FIG. 15. FIG. 16B depicts a top view of the internal components of the thin-profile monitoring device of FIG. 16A (i.e., with cavity assembly 12 removed). The internal components may include sensor board 32, battery 36 and receiver coil 62 arranged in a side-by-side manner and secured in place by securing member 96. One may observe how ports 16*a*, 16*b* and 16*c* are directly aligned over sensors 34*a*, 34*b* and 34*c*, respectively, allowing channels connecting the ports and the cavities (within which the sensors are disposed) to be as short as possible.

Figure 16D:
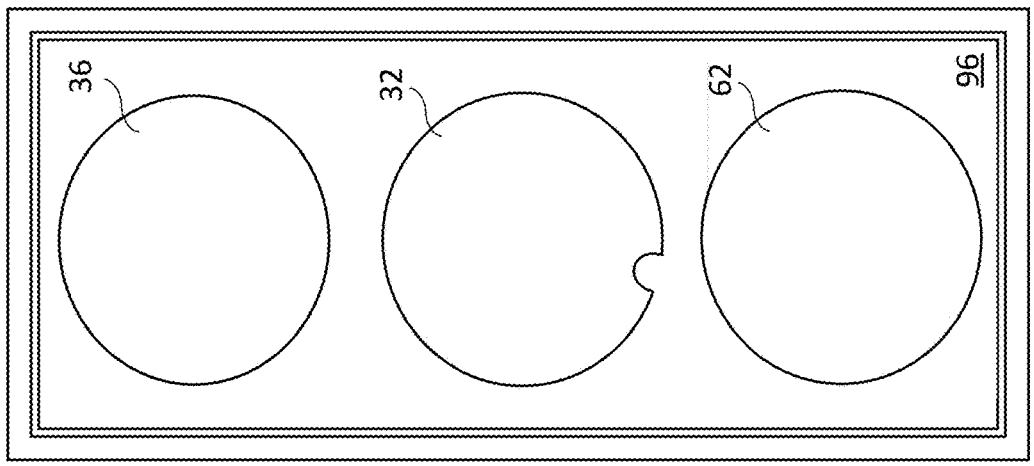
FIG. 16D depicts a bottom view of internal components of the thin-profile monitoring device of FIG. 16A, in accordance with one embodiment of the invention.
Figure 16C:
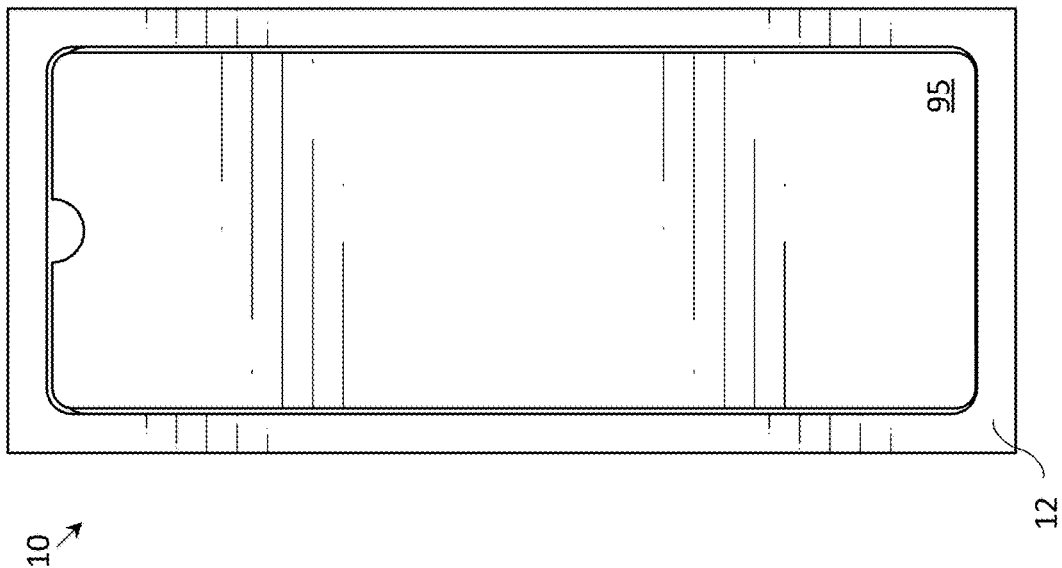
FIG. 16C depicts a bottom view of the thin-profile monitoring device of FIG. 16A, in accordance with one embodiment of the invention.

FIG. 16C depicts a bottom view of the thin-profile monitoring device 10 of FIG. 16A. The bottom view includes the backside of cavity assembly 12, which includes a removeable panel 95, which when removed, allows access to the internal components of thin-profile monitoring device 10. FIG. 16D depicts a bottom view of internal components of the thin-profile monitoring device of FIG. 16A. The bottom sides of sensor board 32, battery 36 and receiver coil 62 are visible in FIG. 16D, and these components are secured in placed by securing member 96.

Figure 17B:
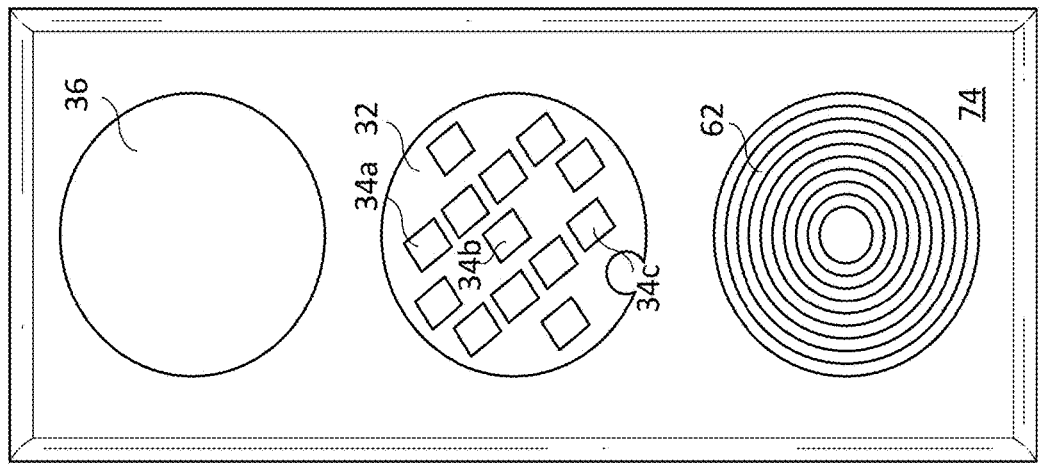
FIG. 17B depicts a top view of internal components of the thin-profile monitoring device of FIG. 17A, in accordance with one embodiment of the invention.
Figure 17A:
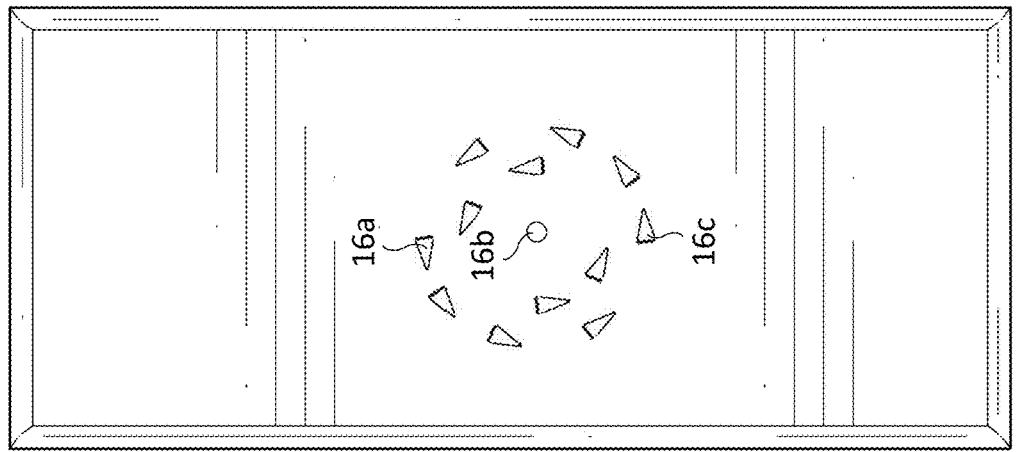
FIG. 17A depicts a top view of a thin-profile monitoring device with an arrangement of ports, in which each of the ports is disposed on a common surface of the thin-profile component and has a distinct orientation on the common surface, in accordance with one embodiment of the invention.

FIG. 17A depicts a top view of a thin-profile monitoring device with an arrangement of ports that differs from that depicted in FIG. 16A. The central circular port 16b is still present in FIG. 17A, but the angled ports are no longer distributed about the circumference of a circle. Instead, the angled ports are distributed so as to correspond to the locations of the sensors on sensor board 32, as depicted in FIG. 17B (i.e., resembling the sensor board 32 from the embodiment previously described in FIGS. 1A-1H).

FIG. 18A depicts a top view of port 16d of a monitoring device. Port 16d is an optimized version of the "angled" (or triangular-shaped) ports presented in FIGS. 15, 16A and 17A, in which the sharp corners of the "angled" ports have been rounded to reduce turbulence. Simulations indicate no wake turbulence being associated with these optimized ports. Port 16d includes rim 97 that is at the same elevation as the flow-facing surface formed by cavity assembly 12. Port 16d is joined with channel 40 which leads to an internal cavity of cavity assembly 12. Sloping portion 98 may act as an interface between rim 97 and channel 40. FIG. 18B depicts a cross-sectional view of the port of FIG. 18A along cut line II-II. Channel 40 and rim 97 are visible in the cross-sectional view, and as well as the contour of the sloping portion 98.

Figure 19A:
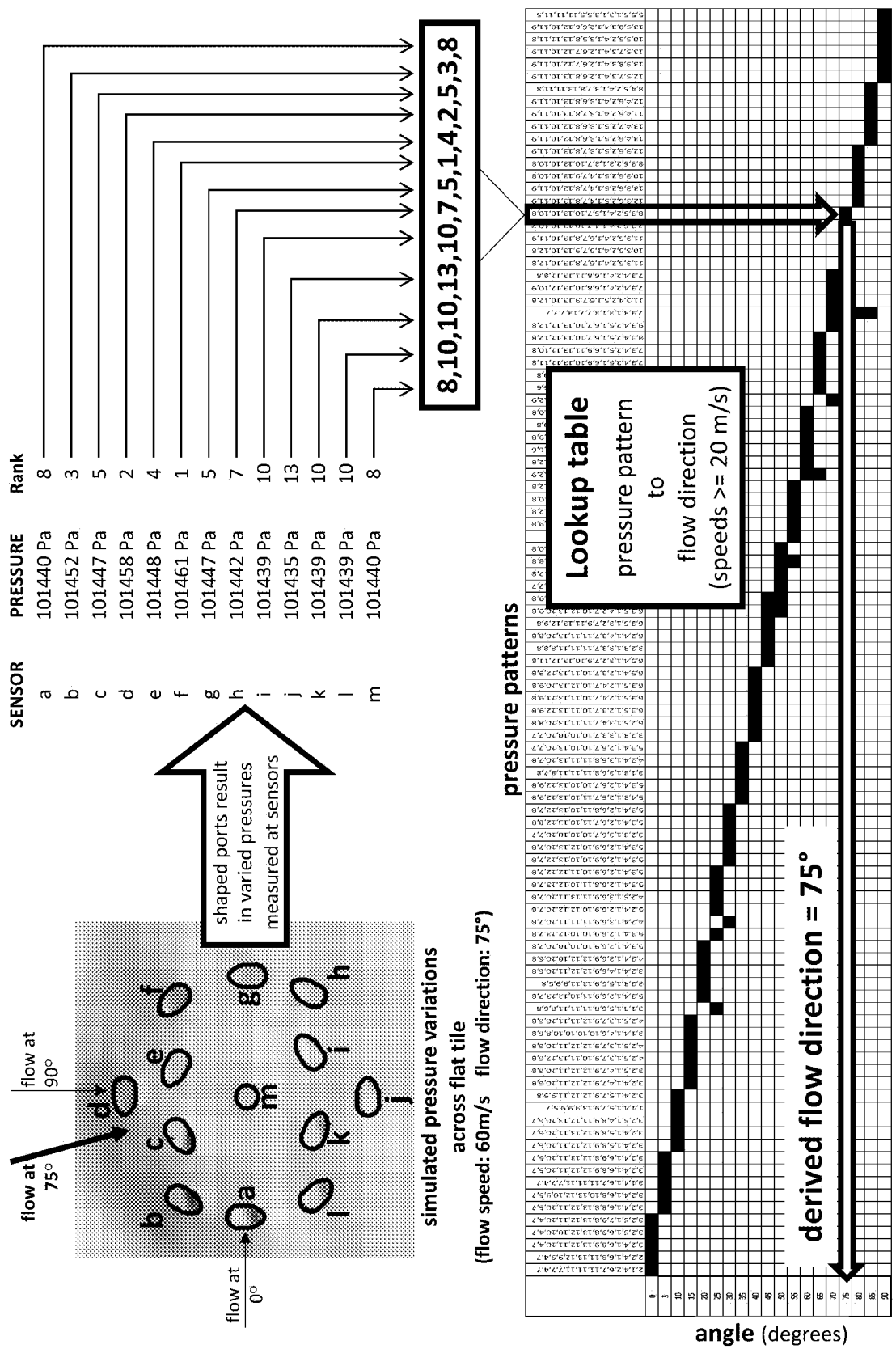
FIG. 19A depicts a lookup table that maps pressure patterns to flow directions, in accordance with one embodiment of the invention.

Candidate velocimeter designs were simulated numerically to predict measurement accuracy and disruption to the measured flow. Simulations involving the ports in FIG. 18A in the orientations depicted in the upper left image of FIG. 19A were performed using COMSOL Multiphysics, a cross-platform finite element analysis, solver and Multiphysics simulation software provided by COMSOL, Inc.® of Stockholm, Sweden. The simulations were across a range of flow speeds and angles. Each of the "ovals" in the upper left image of FIG. 19A represents one of the ports shown in FIG. 18A. Lookup tables generated using these simulated results are displayed in FIGS. 19A and 19B.

FIG. 19A shows a lookup table to map each pressure pattern to one or more incident flow angles (i.e., a flow directions). In the example application of the lookup table depicted in FIG. 19A, the pressure pattern of (8, 10, 10, 13, 10, 7, 5, 1, 4, 2, 5, 3, 8) is mapped to the flow direction of 75° using the lookup table. While each port is labeled with a sensor label "a, b, c, . . . ", it is understood that these labels are intended to label the sensor that measures the pressure from that corresponding port. As indicated in FIG. 19A, the lookup table is only useful for estimating the flow direction for speed greater or equal to 20 m/s. While the data used to populate the lookup table was the output of simulations, the data could also be gathered using wind tunnel calibrations and a functioning (fully calibrated) velocimeter.

Figure 19B:
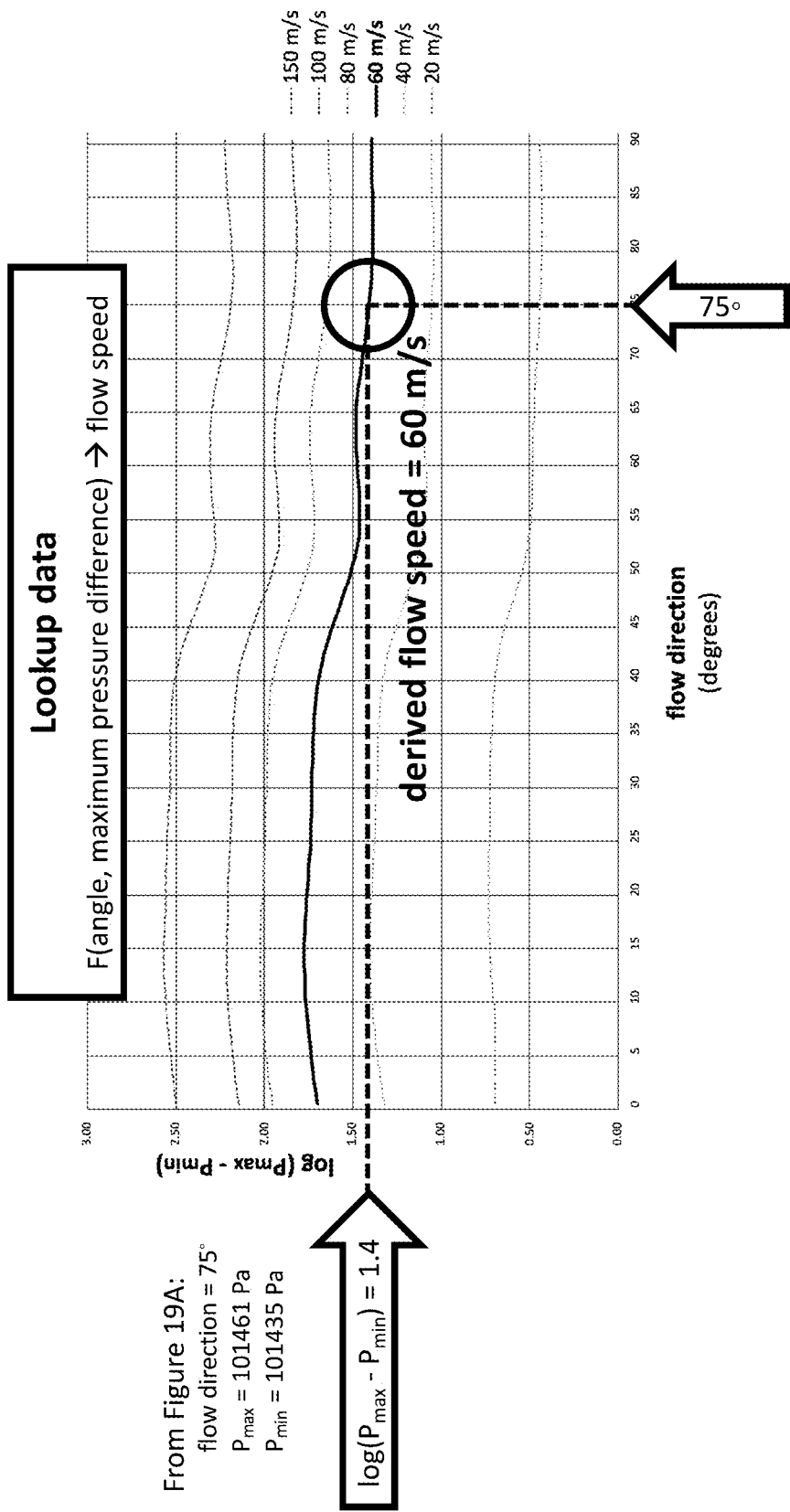
FIG. 19B depicts a lookup table that maps a flow direction and the maximum pressure difference to a flow speed, in accordance with one embodiment of the invention.

FIG. 19B shows a lookup table to map a pairing of flow direction and maximum pressure difference (more specifically maximum log pressure difference) to a flow speed. More specifically, the maximum log pressure difference refers to the log of the maximum pressure difference that is measured between any two of the pressure sensors. In the example application of the lookup table depicted in FIG. 19B (which continues with the example from FIG. 19A), the flow direction of 75° and the maximum log pressure difference of 1.4 is mapped to the flow speed of 60 m/s. Hence, FIGS. 19A and 19B illustrate a two-step procedure (apply lookup table of FIG. 19A, and then apply lookup table of FIG. 19B) to arrive at the flow direction and flow speed from pressure measurements sampled by a monitoring device.

More specifically, the lookup table of FIG. 19B shows a correlation between the maximum pressure difference and the incident flow speed. However, due to the flat tile profile and asymmetries in port placement, a maximum pressure difference typically does not map to a unique speed. For example, the maximum pressure difference of 1.4 could map to a speed of 40 m/s at an incident angle of 20 degrees. Therefore, the incident flow angle (i.e., the flow direction) is used to discriminate between possible flow speeds indicated by the maximum pressure difference alone. The data of the lookup table of FIG. 19B can also be generated via simulations or wind tunnel calibrations and a functioning (fully calibrated) velocimeter.

The velocimeter (or more generally, the monitoring device) described herein may be used in real-world applications like flight testing and road testing. Its configurability makes it cost effective for many types of flow measurement, and its scalability permits measurement of flow fields across a large aerodynamically-shaped area. It is noted that while most of the description was related to using the monitoring device to monitor the velocity of a fluid flow, it is noted that the sole purpose of the monitoring device may be used to sample the pressure of the fluid flow at ports distributed about the flow-facing surface, and such pressure measurements may be transmitted to remote computing device 50 for analysis and/or processing. Further, it is noted that while most of the description was directed to sensors that performed pressure measurements, it is possible that the sensors may sense other quantities such as temperature, vibration, acoustic waves (e.g., whether audible or not audible), and/or humidity in the alternative or in addition to pressure.

Figure 20:
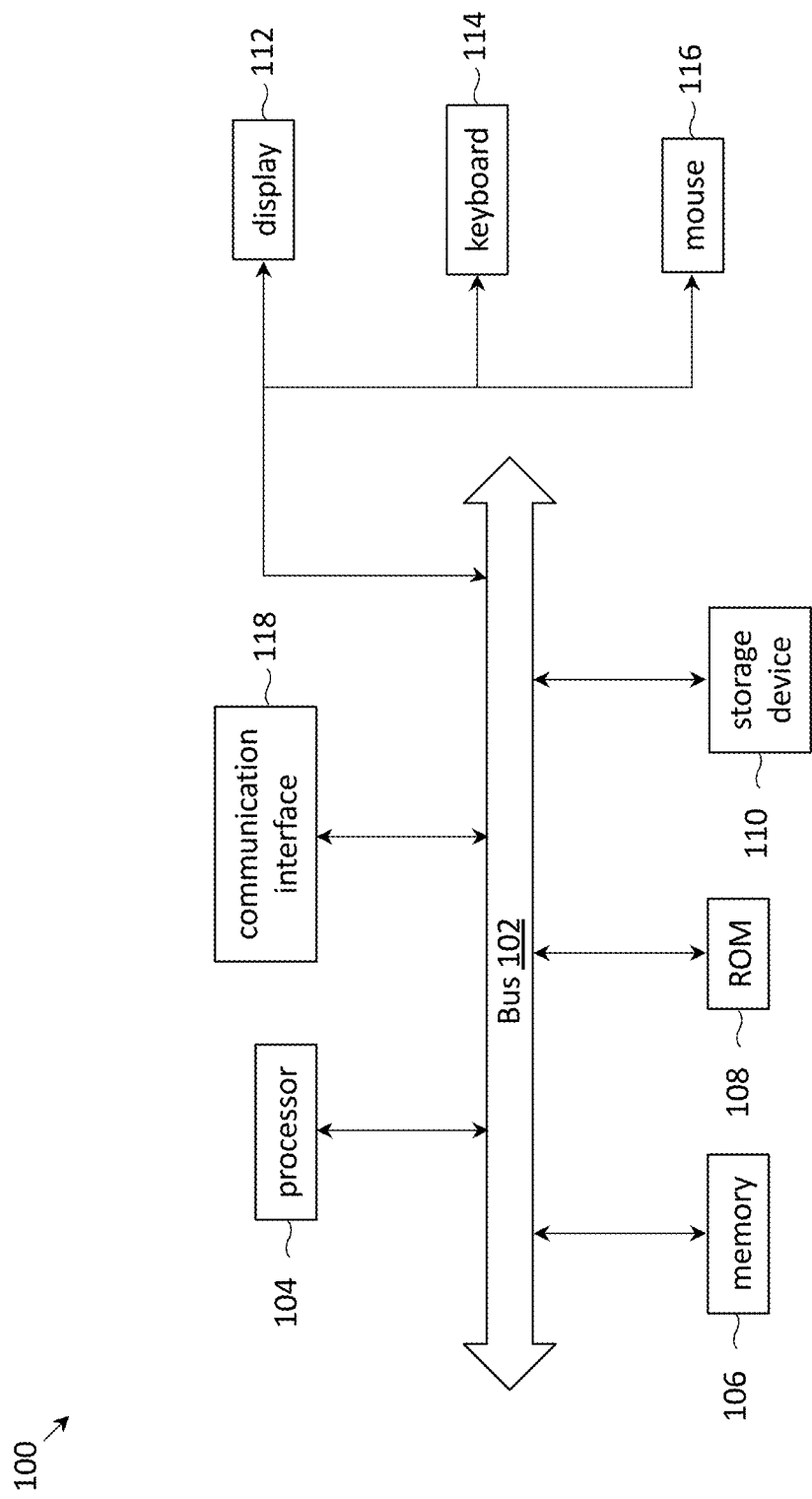
FIG. 20 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 20 provides an example of system 100 that may be representative of any of the computing systems (e.g., sensor module 18, PC 50, smartphone 50) discussed herein. Note, not all of the various computer systems have all of the features of system 100. For example, certain ones of the computer systems discussed above may not include a display inasmuch as the display function may be provided by a client computer communicatively coupled to the computer system or a display function may be unnecessary. Such details are not critical to the present invention.

System 100 includes a bus 102 or other communication mechanism for communicating information, and a processor 104 (e.g., a microcontroller, an ASIC, a CPU, etc.) coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, for example a hard disk, flash memory-based storage medium, or other storage medium from which processor 104 can read, is provided and coupled to the bus 102 for storing information and instructions (e.g., operating systems, applications programs and the like).

Computer system 100 may be coupled via the bus 102 to a display 112, such as a flat panel display, for displaying information to a computer user. An input device 114, such as a keyboard including alphanumeric and other keys, may be coupled to the bus 102 for communicating information and command selections to the processor 104. Another type of user input device is cursor control device 116, such as a mouse, a trackpad, or similar input device for communicating direction information and command selections to processor 104 and for controlling cursor movement on the display 112. Other user interface devices, such as microphones, speakers, etc. are not shown in detail but may be involved with the receipt of user input and/or presentation of output.

The processes referred to herein may be implemented by processor 104 executing appropriate sequences of computer-readable instructions contained in main memory 106. Such instructions may be read into main memory 106 from another computer-readable medium, such as storage device 110, and execution of the sequences of instructions contained in the main memory 106 causes the processor 104 to perform the associated actions. In alternative embodiments, hard-wired circuitry or firmware-controlled processing units may be used in place of or in combination with processor 104 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 100 or similar electronic computing device, that manipulates and transforms data represented as physical (electronic) quantities within its registers and memories into other data similarly represented as physical quantities within its memories or registers or other such information storage, transmission or display devices.

Computer system 100 also includes a communication interface 118 coupled to the bus 102. Communication interface 118 may provide a two-way data communication channel with a computer network, which provides connectivity to and among the various computer systems discussed above. For example, communication interface 118 may be a local area network (LAN) card to provide a data communication connection to a compatible LAN, which itself is communicatively coupled to the Internet through one or more Internet service provider networks. The precise details of such communication paths are not critical to the present invention. What is important is that computer system 100 can send and receive messages and data through the communication interface 118 and in that way communicate with hosts accessible via the Internet. Communication may be in real-time or in "batch" mode, wherein data is recorded in memory for subsequent downloading.

Thus, a configurable flow velocimeter has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A monitoring device, comprising:
   an aeroshell;
   a cavity assembly including a plurality of cavities; and
   a sensor module including a plurality of sensors,
   wherein the sensor module is disposed between the aeroshell and the cavity assembly,
   wherein a surface of the aeroshell and a surface of the cavity assembly form a flow-facing surface of the monitoring device,
   wherein a junction area on the flow-facing surface within which the aeroshell abuts the cavity assembly is a smooth surface,
   wherein the aeroshell is securely attached to the cavity assembly, and
   wherein each of the sensors is configured to measure a pressure within a corresponding cavity of the cavity assembly.

2. The monitoring device of claim 1, wherein the flow-facing surface of the monitoring device comprises a plurality of ports, and wherein two or more of the ports are fluidly connected to a common one of the plurality of cavities.

3. The monitoring device of claim 2, wherein an outline of each of the ports is one or more of an oval or a triangle.

4. The monitoring device of claim 2, wherein at least two of the ports are oriented along a line that extends in a direction perpendicular to a surface on which the monitoring device is mounted.

5. The monitoring device of claim 1, wherein a surface of the aeroshell that forms the flow-facing surface is a convex surface.

6. The monitoring device of claim 1, wherein the aeroshell comprises a hook, wherein the cavity assembly comprises a catching member, and wherein the hook is configured to catch the catching member so as to securely attach the aeroshell to the cavity assembly.

7. The monitoring device of claim 1, further comprising:
   a rechargeable battery,
   wherein the sensor module is electrically coupled to the rechargeable battery, and wherein the rechargeable battery is configured to at least one of receive inductively transmitted energy or harvested energy.

8. The monitoring device of claim 1, further comprising:
   a replaceable battery,
   wherein the sensor module is electrically coupled to the replaceable battery, and
   wherein the replaceable battery is disposed between the cavity assembly and the aeroshell such that removal of the aeroshell allows a user to replace the replaceable battery.

9. The monitoring device of claim 1, wherein the sensor module comprises a first planar surface and a second planar surface, wherein the first planar surface and the second planar surface are disposed at different elevations, and wherein a first subset of the sensors are mounted on the first planar surface and a second subset of the sensors are mounted on the second planar surface.

10. A monitoring device, comprising:
    an aeroshell;
    a cavity assembly including a plurality of cavities; and
    a sensor module including a plurality of sensors, wherein the sensor module is disposed between the aeroshell and the cavity assembly, wherein a surface of the aeroshell and a surface of the cavity assembly form a flow-facing surface of the monitoring device, wherein a junction area on the flow-facing surface within which the aeroshell abuts the cavity assembly is a smooth surface, wherein the aeroshell is securely attached to the cavity assembly, wherein the flow-facing surface of the monitoring device comprises a plurality of ports, and wherein each of the ports is connected to a corresponding one of the plurality of cavities.

11. The monitoring device of claim 10, wherein an outline of each of the ports is one or more of an oval or a triangle.

12. The monitoring device of claim 10, wherein at least two of the ports are oriented along a line that extends in a direction perpendicular to a surface on which the monitoring device is mounted.

13. The monitoring device of claim 10, wherein a surface of the aeroshell that forms the flow-facing surface is a convex surface.

14. The monitoring device of claim 10, wherein the aeroshell comprises a hook, wherein the cavity assembly comprises a catching member, and wherein the hook is configured to catch the catching member so as to securely attach the aeroshell to the cavity assembly.

15. A method of using a monitoring device comprising (i) a cavity assembly including a plurality of cavities, and (ii) a sensor module including a plurality of sensors, wherein the sensor module is enclosed within the cavity assembly, wherein the cavity assembly forms a flow-facing surface of the monitoring device, and wherein the cavity assembly comprises a flexible material so as to allow a surface of the cavity assembly to conform to a contour of a non-planar mounting surface, the method, comprising;

mounting the monitoring device on a mounting surface, wherein the flow-facing surface of the monitoring device is oriented parallel to the mounting surface.

16. The method of claim 15, wherein each of the sensors is configured to measure a pressure within a corresponding cavity of the cavity assembly.

17. The method of claim 15, wherein no gap is present between the monitoring device and the non-planar mounting surface.

18. The method of claim 15, wherein a shape of the monitoring device permits the monitoring device to be arranged as a part of a tessellation.

19. The method of claim 15, wherein the cavity assembly comprises an aerodynamic edge profile with a smooth transition between a top surface of the cavity assembly and a side surface of the cavity assembly.

20. The method of claim 15, wherein the monitoring device further comprises an electrical port, and wherein the cavity assembly comprises:

a top surface; and a side surface, wherein the electrical port is disposed on the side surface of the cavity assembly, the electrical port configured to at least one of communicate data signals or supply power to the monitoring device.

* * * * *